US012618244B2

(12) United States Patent
Patki et al.

(10) Patent No.: US 12,618,244 B2
(45) Date of Patent: *May 5, 2026

(54) FLOOR ELEMENT FOR FORMING A FLOOR COVERING AND A FLOOR COVERING

(71) Applicant: Unilin BV, Wielsbeke (BE)

(72) Inventors: Rahul Patki, Richardson, TX (US); Laurent Meersseman, Kortrijk (BE); Claudio Beneventi, Sassuolo (IT); Claudio Caselli, Dallas, TX (US)

(73) Assignee: Unilin BV, Wielsbeke (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,116

(22) Filed: Oct. 31, 2023

(65) Prior Publication Data

US 2024/0060313 A1 Feb. 22, 2024

Related U.S. Application Data

(63) Continuation of application No. 17/660,866, filed on Apr. 27, 2022, which is a continuation of application
(Continued)

(30) Foreign Application Priority Data

May 15, 2017 (EP) ..................................... 17000832

(51) Int. Cl.
*E04F 13/08* (2006.01)
*B32B 3/06* (2006.01)
(Continued)

(52) U.S. Cl.
CPC .......... *E04F 13/0866* (2013.01); *E04F 13/14* (2013.01); *E04F 15/02005* (2013.01);
(Continued)

(58) Field of Classification Search
CPC . E04F 13/0866; E04F 13/14; E04F 15/02005; E04F 15/082; E04F 2201/0146;
(Continued)

(56) References Cited

U.S. PATENT DOCUMENTS 3,978,263 A 8/1976 Wellensiek
4,546,024 A * 10/1985 Brown .............. E04F 15/02016
428/44
(Continued)

FOREIGN PATENT DOCUMENTS

CA 1091837 A * 12/1980
CN 1812873 A 8/2006
(Continued)

OTHER PUBLICATIONS

International Search Report and Written Opinion for International (PCT) Application No. PCT/IB2018/053331 mailed Jul. 6, 2018.
(Continued)

*Primary Examiner* — Omar F Hijaz
(74) *Attorney, Agent, or Firm* — Troutman Pepper Locke LLP; James E. Schutz; Chris N. Ph. Davis D.

(57) ABSTRACT

A floor element for forming a floor covering, wherein the floor element comprises a decorative layer made of a ceramic material; a support layer arranged below the decorative layer; and a reinforcing layer arranged in between the decorative layer and the support layer, wherein the support layer comprises edges provided with coupling elements configured to realize a mechanical coupling with coupling elements of an adjacent floor element.

16 Claims, 8 Drawing Sheets

Related U.S. Application Data

No. 16/612,574, filed as application No. PCT/IB2018/053331 on May 14, 2018, now Pat. No. 11,346,113.

(51) Int. Cl.

| | |
|---|---|
| *B32B 9/00* | (2006.01) |
| *B32B 13/06* | (2006.01) |
| *B32B 13/12* | (2006.01) |
| *B32B 13/14* | (2006.01) |
| *B32B 15/18* | (2006.01) |
| *B32B 17/02* | (2006.01) |
| *B32B 17/06* | (2006.01) |
| *B32B 27/30* | (2006.01) |
| *E04F 13/14* | (2006.01) |
| *E04F 15/02* | (2006.01) |
| *E04F 15/08* | (2006.01) |

(52) U.S. Cl.

CPC .............. *E04F 15/082* (2013.01); *B32B 3/06* (2013.01); *B32B 9/002* (2013.01); *B32B 9/005* (2013.01); *B32B 13/06* (2013.01); *B32B 13/12* (2013.01); *B32B 13/14* (2013.01); *B32B 15/18* (2013.01); *B32B 17/02* (2013.01); *B32B 17/067* (2013.01); *B32B 27/304* (2013.01); *B32B 2250/05* (2013.01); *B32B 2262/0269* (2013.01); *B32B 2262/101* (2013.01); *B32B 2262/105* (2013.01); *B32B 2262/106* (2013.01); *B32B 2307/558* (2013.01); *B32B 2307/7265* (2013.01); *B32B 2471/00* (2013.01); *E04F 2201/0146* (2013.01); *E04F 2201/02* (2013.01)

(58) Field of Classification Search

CPC ............ E04F 2201/02; E04F 2201/096; E04F 2201/098; E04F 2203/065; E04F 13/0862; B32B 3/06; B32B 9/002; B32B 9/005; B32B 13/06; B32B 13/12; B32B 13/14; B32B 15/18; B32B 17/02; B32B 17/067; B32B 27/304; B32B 2250/05; B32B 2262/0269; B32B 2262/101; B32B 2262/105; B32B 2262/106; B32B 2307/558; B32B 2307/7265; B32B 2471/00; B32B 9/045; B32B 2262/14; B32B 9/041; B32B 5/022; B32B 5/024; B32B 7/12; B32B 2307/732; B32B 9/04; B32B 2307/50; B32B 13/02; B32B 13/04; B32B 9/047; B32B 17/06; B32B 27/40; C04B 33/24

See application file for complete search history.

(56) References Cited

U.S. PATENT DOCUMENTS

| | | | |
|---|---|---|---|
| 4,567,704 A * | 2/1986 | Bernett ............... | E04F 13/0862 |
| | | | 52/309.3 |
| 7,442,423 B2 * | 10/2008 | Miller .................. | B32B 17/062 |
| | | | 52/390 |
| 7,610,731 B1 | 11/2009 | Collison | |
| 8,192,823 B2 | 6/2012 | Hainbach | |
| 8,726,603 B2 | 5/2014 | Huang | |
| 9,896,851 B1 | 2/2018 | Collins | |
| 2003/0131549 A1 | 7/2003 | Kappeli et al. | |
| 2005/0138882 A1 | 6/2005 | Rothdach et al. | |
| 2006/0057345 A1 * | 3/2006 | Surace ................... | B32B 21/08 |
| | | | 428/464 |
| 2007/0113502 A1 | 5/2007 | Nunn | |
| 2008/0187710 A1 * | 8/2008 | Stanchfield ............. | B32B 21/04 |
| | | | 428/542.2 |
| 2008/0193669 A1 | 8/2008 | Coadou | |
| 2008/0199676 A1 | 8/2008 | Bathelier et al. | |
| 2008/0251198 A1 | 10/2008 | Tinianov | |
| 2009/0320402 A1 | 12/2009 | Schacht et al. | |
| 2010/0300032 A1 | 12/2010 | Kang | |
| 2011/0207870 A1 | 8/2011 | Bussels et al. | |
| 2013/0104485 A1 * | 5/2013 | Meersseman ............ | B27N 7/00 |
| | | | 428/53 |
| 2014/0349084 A1 | 11/2014 | Patki et al. | |
| 2015/0233127 A1 * | 8/2015 | Dohring ............ | E04F 15/02172 |
| | | | 52/177 |
| 2016/0168865 A1 | 6/2016 | Pervan | |
| 2017/0144427 A1 * | 5/2017 | Klackmann-Schneider ................ | |
| | | | E04F 15/163 |
| 2017/0370109 A1 * | 12/2017 | Devos ............... | E04F 15/02038 |
| 2018/0245333 A1 * | 8/2018 | Patki ......................... | E04B 1/82 |
| 2025/0003231 A1 * | 1/2025 | Van Vlassenrode .... | B32B 27/40 |

FOREIGN PATENT DOCUMENTS

| | | | |
|---|---|---|---|
| CN | 101918656 A | 12/2010 | |
| CN | 105358777 A * | 2/2016 | ............. B32B 21/02 |
| CN | 105358777 A1 | 2/2016 | |
| DE | 10253553 A1 | 10/2003 | |
| DE | 102006033203 A1 | 2/2008 | |
| EP | 2369090 A1 | 9/2011 | |
| JP | H09228511 A | 9/1997 | |
| JP | 2012-026260 A | 9/2012 | |
| KR | 20110031447 A | 3/2011 | |
| KR | 20110064350 A1 | 6/2011 | |
| WO | 9606716 A1 | 3/1996 | |
| WO | 2004/097141 A2 | 11/2004 | |
| WO | 2008/097860 A2 | 8/2008 | |
| WO | 2009/142365 A1 | 11/2009 | |
| WO | 2010/072704 A1 | 7/2010 | |
| WO | 2014053186 A1 | 4/2014 | |
| WO | 2017013501 A1 | 1/2017 | |

OTHER PUBLICATIONS

European Search Report for European Application No. 1700832.0 mailed Nov. 15, 2017.

Machine translation for Japanese Application No. 2012-026260, 16 pages.

Machine translation for Korean Application No. 20110064350, 12 pages.

* cited by examiner

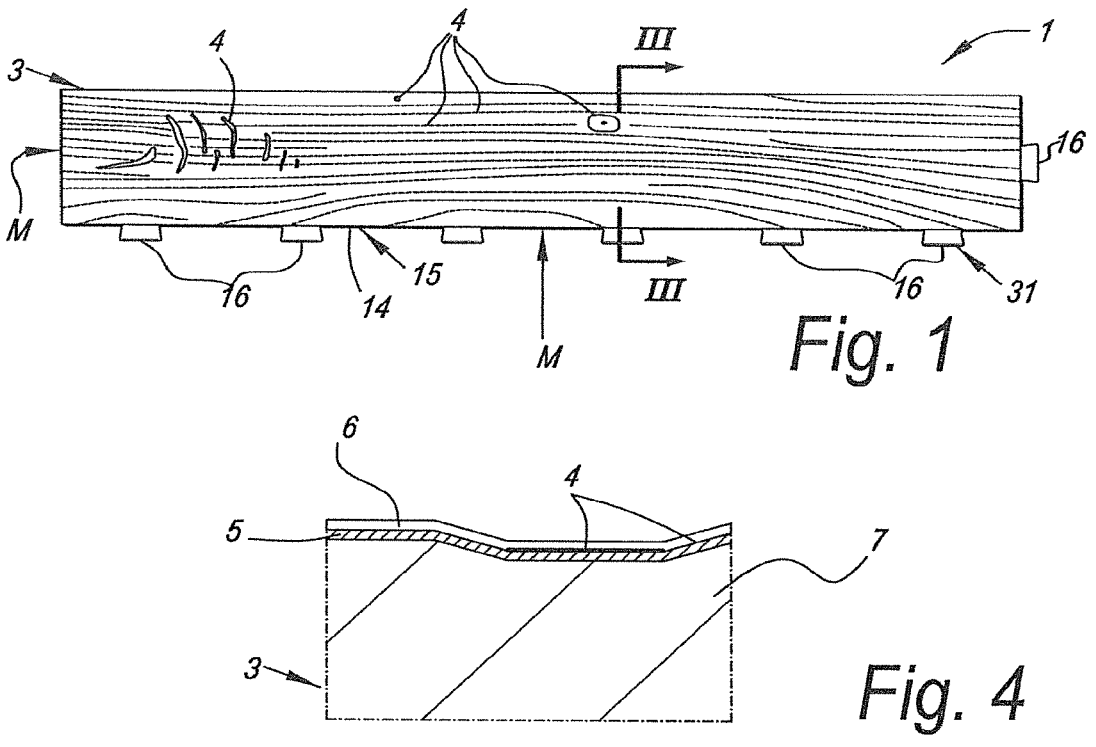
Fig. 1
Fig. 4
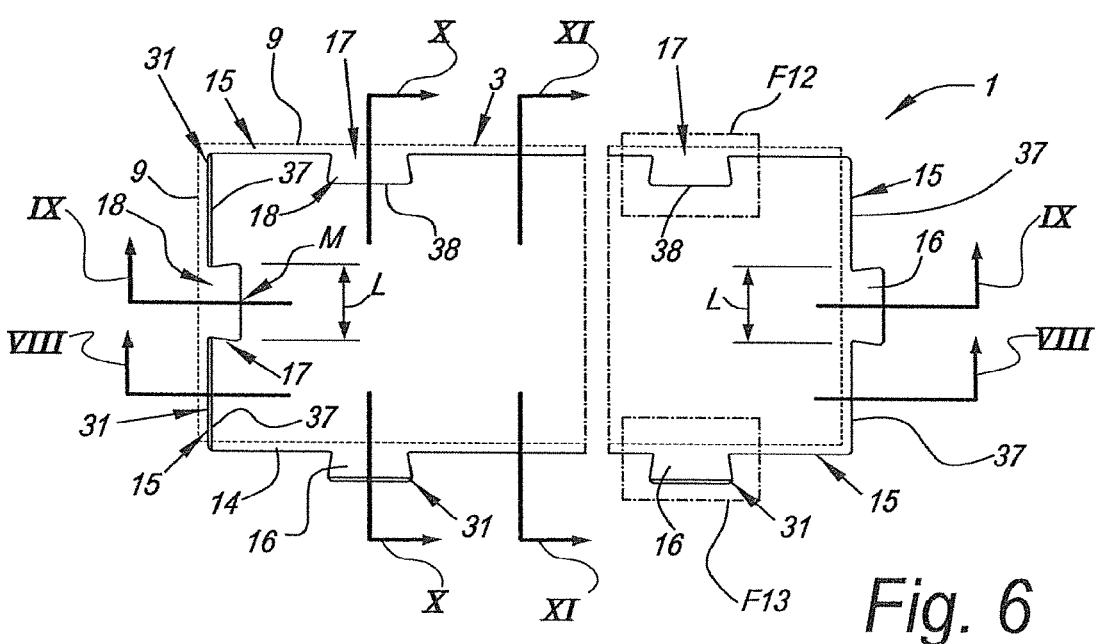
Fig. 6

FLOOR ELEMENT FOR FORMING A FLOOR COVERING AND A FLOOR COVERING

CROSS-REFERENCE TO RELATED APPLICATIONS

This application is a continuation of U.S. patent application Ser. No. 17/660,866 filed 27 Apr. 2022, which is a continuation of U.S. patent application Ser. No. 16/612,574 filed on 11 Nov. 2019, now U.S. Pat. No. 11,346,113, which is a National Stage Entry of and claims priority to PCT Application No. PCT/IB2018/053331, filed on 14 May 2018, which claims priority to EP Application No. EP17000832.0, filed 15 May 2017, the disclosures of each of which are herein incorporated by reference in their entirety.

BACKGROUND OF THE INVENTION

1. Field of the Invention

The present invention relates to a floor element for forming a floor covering and a floor covering.

More particularly, the invention is related to a floor element for forming a floor covering, wherein this floor element comprises a decorative layer made of a brittle material such as natural stone, glass or sintered ceramic materials like porcelain, earthenware or the like. The decorative layer can for example be a ceramic tile.

2. Related Art

Traditionally, ceramic tiles are installed by laying them side by side on a surface such as a floor or wall. Typically, an adhesive compound is used to attach the tiles to the surface. Seams between the tiles are grouted. In this way, the tiles are bonded to a rigid surface, for example a concrete subfloor, thereby improving their impact strength. The bound with the subfloor, and thus also with the structure of the dwelling, also leads to a high attenuation of walking sounds, both in the room where the floor is installed, and in quarters below the respective room. The tiled surface is water impervious and hygienic, since it can be cleaned in a very wet manner. The step of installing the tiles with an adhesive is, however, labor intensive and represents a significant portion of the labor involved in a typical floor covering installation. Moreover, this installing technique requires a high professional competence in order to obtain a well levelled floor covering. Thus, due to the time and labor involved in the installation, it is typically quite costly to have tiles professionally installed.

To substitute an existing floor covering made of tiles, it is often necessary to break the tiles, regenerate the surface by removing the residues of adhesive and then install a new floor covering. Thus, the demolition of a floor covering made of tiles is a labor and time consuming operation. If the aim of the restoration is to substitute only one or a few damaged tiles, this operation becomes also difficult, since the substitution of one tile preferably does not damage the adjacent tiles.

In recent years, manufacturers have attempted to produce do-it-yourself tiling solutions that are easier to install. Some examples of these attempts are shown in WO 2004/097141 and WO 2008/097860. The floor elements disclosed in those documents can be laid on a surface and mechanically coupled together to form a floor covering without the use of an adhesive, thereby reducing the labor and time of the installing phase. Such kind of floor covering is known as a floating floor covering. In particular, in these documents, a ceramic tile or natural stone slab is fixed to a support layer that comprises coupling elements configured to realize a coupling with coupling elements of an adjacent floor element, thereby forming a floor covering.

On the other hand, since such floor elements are not bonded to a common rigid surface, the impact strength and, consequently, the fatigue strength is significantly reduced. The floating installation may also give rise to louder walking noise. The joints between the tiles of WO 2008/097860 may be prone to water penetration especially upon wet cleaning. According to some embodiments of WO 2004/097141, grout may be applied in the joints available between adjacent floor elements, which may lead to water imperviousness of the respective joint.

To improve the impact resistance of ceramic tiles, US 2014/349084 suggests a tile with a composite build-up. In this composite tile, a reinforcing layer is arranged in between two ceramic layers or in between a ceramic layer and a polymer laminate. As example of a reinforcing layer, a fiberglass layer is mentioned. The installation of this tile is, however, still cumbersome. A bonding with an underlying subfloor is required, for example via a bottom layer with pressure sensitive adhesive or tack fast loop fabric so that the tile is substantially made solid with the subfloor for improving the impact strength. Moreover, a precise positioning of the tile is difficult.

WO 2010/072704 proposes a different type of reinforcing layer, namely a steel plate. This steel plate is adhered to the back surface of the ceramic tile or slab. Also here, the installation is, however, difficult. The installation is done by simply resting the tiles on a subfloor, so that a precise positioning of the tile is difficult and the floor covering results in a not well levelled surface and in a noisy and permeable floor covering.

SUMMARY OF THE DISCLOSURE

The present invention aims in the first place to provide an alternative floor element, which, in accordance with several preferred embodiments, is directed to solve one or more of the problems arising in the state of the art.

Thereto, the present invention, according to a first independent aspect, relates to a floor element for forming a floor covering, wherein this floor element comprises a decorative layer made of a ceramic material and a support layer arranged below this decorative layer, wherein the support layer comprises edges provided with coupling elements configured to realize a mechanical coupling with coupling elements of an adjacent floor element and wherein the floor element comprises a reinforcing layer arranged in between the decorative layer and the support layer. The inventors have found that, due to this solution, the impact resistance of the floor element, more particularly of the decorative layer of ceramic, is highly increased, so that, even with the mechanical locking between such floor elements, the impact strength achieves or even exceeds the impact strength of the traditional elements installed by means of adhesives. In fact, the reinforcing layer substantially improves the rigidity of the decorative layer, thereby limiting the propagation of cracks in the decorative layer itself. Furthermore, in case of superficial cracks of the decorative layer, the reinforcing layer keeps the decorative layer itself coherent, and preferably compacted, thereby disguising the visual appearance of the superficial cracks.

Impact strength for flooring can be determined by means of a steel ball impact test. According to this test the impact strength is measured by dropping a steel ball on the floor element from a certain height, if the floor element does not break the height is increased until a height is reached where the steel ball breaks the floor element. The steel ball has a weight of 225.5 grams and a diameter of 38.1 mm (1.5 inches). The impact strength is expressed in terms of the maximum attainable height from which the steel ball, when dropped on the floor element does not break the floor element. The higher the drop height without breakage, the higher the impact strength of the floor element. The impact strength can be expressed in Newton-meter (Nm), i.e. the energy of the steel ball when hitting the surface of the floor element. The inventors have found that traditional floorings, for example floorings made of porcelain floor elements with a thickness of approximately 10 mm, directly glued to a subfloor, usually show impact strength comprised between 1.68 Nm and 2.25 Nm (corresponding to a ball falling from a height comprised between 762 and 1016 mm) whereas known floating floors show an impact strength usually lower than 1.12 Nm (corresponding to a ball falling from a height lower than 508 mm). The inventors have found that, due to this solution, an impact strength of above 1.91 Nm (corresponding to a fall of the steel ball from a height of above 863 mm) can be achieved.

Fatigue strength for flooring is determined by means of the so called Robinson Test according to ASTM C627. According to this test a three-wheel cart rotates about its center on top of a sample section of a tiles floor. Above each wheel is a rod along which weights can be stacked. A power motor drives the assembly and the cart rotates at a rate of 15 revolutions per minute. The test is run according to a loading schedule with 14 different cycles. For each cycle, the schedule specifies a type of wheel to be used (soft rubber, hard rubber, or steel), the amount of weight to be stacked above each wheel, and the total number of cart revolutions to be executed. After the completion of each cycle, the sample floor section is visually examined. The test result qualifies the floor according to the number of cycles passed without failure and indicates the following service level to which the floor is destined:

Sample completing cycles 1 through 3 without failure: "Residential" rating;

Samples completing cycles 1 through 6: "Light" commercial rating;

Samples completing cycles 1 through 10: "Moderate" commercial rating;

Samples completing cycles 1 through 12: "Heavy" commercial rating;

Samples completing all 14 cycles without failure are assigned in "Extra heavy" commercial rating.

The inventors have found that due to the use of a reinforcing layer, the Robinson Test can result in passing 6 cycles (Light Commercial) as minimum.

In accordance with a preferred embodiment of the invention, the decorative layer comprises a ceramic body, for example made of porcelain, stoneware, earthenware, or other sintered ceramic powders. Preferably, the decorative layer is a ceramic tile or slab. The term "ceramic tile" refers to a body consisting of baked minerals, such as clay, and preferably with a fired decorative top surface, preferably a glaze.

It is noted, however, that this first aspect can be advantageously applied with decorative layers being made of any kind of brittle material, such as natural stone, concrete, glass or glass-ceramic material. The term "brittle material" refers to a material that breaks without significant plastic deformation. In particular, for the scope of said patent application, the term brittle material is intended to encompass a material that on its own (if not bonded to a support layer and without reinforcing element) has an impact strength lower than 1.68 (corresponding to a ball falling from a height lower than 762 mm) according to the ball impact test.

The décor of the decorative layer can be provided with a variety of textures, designs and colors. In a preferred embodiment, the decor simulates a natural product, such as natural stone or wood. Preferably, the décor is at least partially formed by a print. The print is preferably realized by means of digital printing, such as inkjet printing, although screen printing, rotogravure, flexography or off-set printing is not excluded. According to an embodiment, the decor is at least partially formed by uniformly colored base material or by a mix of colored base materials.

The decorative layer can comprise a background coating covering at least partially its upper surface and adapted to receive the décor on its top, for example adapted to receive the print on its top. The background coating can be white, beige, brown or of any color suitable to receive a décor on its top. In the case that the decorative layer is made of a ceramic material, the background layer preferably comprises at least a glaze covering the upper surface of the ceramic body.

The decorative layer can also comprise a protective coating covering at least partially its upper surface and adapted to be placed above the décor. The protective coating can be transparent or translucent. The protective coating can be used in combination with the background coating. In the case that the decorative layer is made of a ceramic material, the protective layer preferably is a glaze.

Preferably, the decorative layer has a thickness comprised between 4 and 15 mm, for example 6 mm, preferably greater than 7 mm, for example 10 mm. The inventors have found that by adding a reinforcing layer a satisfying fatigue behavior can be achieved for a relatively thin decorative layer.

The decorative layer can be made of any shape, for example a squared, rectangular or hexagonal shape. In a preferred embodiment, the floor elements are rectangular and oblong in shape, and are preferably provided with a wood grain print depicting wood grain lines extending globally in the longitudinal direction of the rectangular decorative layer. Preferably, the support layer has a shape basically corresponding to the decorative layer, however, preferably, with one or more portions extending beyond the decorative layer and one or more recesses extending underneath the decorative layer. The support layer preferably is a coherent element, wherein the support layer preferably covers the majority, i.e. at least 50 percent, of the lower surface of said decorative layer. Preferably the support layer covers 80 percent or more of the lower surface of the decorative layer. According to another embodiment, the support layer comprises a plurality of separate adjacent support layer portions, in which case said plurality of support layer portions preferably covers at least 50 percent of the lower surface, or even 80 percent or more thereof.

According to the first aspect of the invention, the floor element comprises a reinforcing layer arranged in between the decorative layer and the support layer. Such reinforcing layer can be realized in accordance with several possibilities, of which here below two preferred possibilities are described.

According to a first possibility, the reinforcing layer comprises a fiberglass layer, such as a fiberglass mat, a fiberglass fleece or a fiberglass cloth. In combination or as an alternative to glass fibers, the reinforcing layer can comprise carbon fibers, polymeric fibers, for example aramid or polyamide fibers, or ceramic fibers, for example boron or silicate fibers. The reinforcing layer can comprise woven or non-woven fibers, for example with fibers disposed at different orientations. The reinforcing layer can also comprise a plurality of fiber layers overlaying each other, for example with fibers disposed at different orientations in each layer. A fiber layer provides a rigid reinforcing layer, thereby increasing the rigidity of the decorative layer to define a hindrance to the propagation of cracks in the decorative layer itself.

According to a second possibility, the reinforcing layer comprises a metal plate, for example a steel plate. Preferably, the metal plate is configured to establish a compressive state in the decorative layer. In this way, since the decorative layer is in a compressive state, the impact resistance is strongly improved, because the compression obstacles the propagation of cracks and helps in disguising the visual effect of superficial cracks. To achieve this goal, the metal plate is first stretched, for example by means of a mechanical or thermal stretching, and then is bonded to the decorative layer while the metal plate is in the stretched state. Subsequently, the stretch is released, by interrupting the mechanical solicitation or by cooling the metal plate itself, thereby establishing a compressive state in the decorative layer.

According to a preferred embodiment, the metal plate has a coefficient of thermal expansion higher than the coefficient of thermal expansion of the decorative layer. Due to this solution, the reinforcing layer is heated to a stretched state, then the reinforcing layer is bonded to the decorative layer while it is still in the stretched state and subsequently it is cooled down to retract and put the decorative layer in compression.

In a preferred embodiment, the metal plate is a steel plate, preferably having a thickness between 0.1 and 1 mm, for example 0.2 mm.

The inventors have found that embodiments in accordance with said second possibility may achieve an impact resistance of approximately 3.09 Nm (corresponding to a ball falling from a height of 1397 mm) and a Robinson Test result of Extra Heavy Commercial. Due to this solution, it is possible to use ceramic tiles having standard thickness for a floating floor covering.

The inventors have, rather surprisingly, found that, with such metal plate, good results can be obtained even with a relatively thin decorative layer of ceramic. For example, the decorative layer can be less than 15 mm, more preferably less than 12 mm. Preferably, the thickness of the decorative layer is, however, at least 7 mm. With such thickness values, excellent impact resistance can be obtained, even with the mechanical connection between the floor elements. For example, impact resistance of approximately 3.09 Nm (corresponding to a ball falling from a height of 1397 mm) and a Robinson Test result of Extra Heavy Commercial can be achieved. An advantage is also that, for the decorative layer, a ceramic tile with standard thickness can be used, e.g. a ceramic tile with a thickness of 10 mm. Moreover, no additional layers are needed for achieving a good impact resistance. For example, no intermediate layer, with the exception of non-structural layers such as adhesive layers, between the decorative layer and the metal plate, and/or between the metal plate and the support layer, is needed. Hence, the total thickness of the floor element can be limited. In a preferred construction, the decorative layer is directly bonded to the metal plate and the metal plate directly bonded to the support layer.

In general, the reinforcing layer is preferably made of a material showing a Young's modulus higher than the Young's modulus of the decorative layer, for example two or three times the Young's modulus of the decorative layer. In this way, a reinforcing layer is provided that increases the rigidity of the decorative layer to define a hindrance to the propagation of cracks.

Preferably, the reinforcing layer is bonded to the decorative layer and/or to the support layer by means of an adhesive layer, for example a glue. In a preferred case, the reinforcing layer is at least directly bonded to the lower surface of the decorative layer.

It is noted that the reinforcing layer is not necessarily disposed directly between the decorative layer and the support layer. In other words, together with the reinforcing layer, one or more other intermediate layers can be provided in between the decorative layer and the reinforcing layer and/or in between the reinforcing layer and the support layer.

For example, the floor element may comprise an intermediate layer disposed in between the reinforcing layer and the support layer or in between the reinforcing layer and the decorative layer. In a preferred case, this intermediate layer is disposed in between the reinforcing layer and the support layer. The inventors have found that by providing such intermediate layer in combination with a reinforcing layer, the strengthening effect is enhanced, so that the impact and the fatigue strength of the floor element are further improved. The inventors have also found that the use of an intermediate layer in combination with a reinforcing layer permits reducing the thickness of the decorative layer For example, it has surprisingly been found that the impact resistance of a thin ceramic tile, such as a tile with a thickness of 6 mm or less, can be remarkably enhanced by laminating to the back surface of said tile a reinforcing layer, such as a fiberglass layer, and to this reinforcing layer an intermediate layer, such as a second tile preferably having the same thickness or about the same thickness as the decorative layer.

The intermediate layer can be made of the same or similar material of the decorative layer. For example, in a preferred embodiment, the intermediate layer is made of a ceramic body or another brittle material, such as one of the materials listed at the outset of the present application. The inventors have found that an intermediate layer made of the same material as the decorative layer is sufficient to exceed the standard strength of a traditional floor.

Possibly, the intermediate layer is made of a lower quality material than the decorative layer, for example it is essentially made of a non-decorated ceramic plate, a non-smoothed natural stone, a recycled ceramic plate, or a ceramic plate made starting from a mixture of raw materials comprising a high amount of waste or scrap material, for example household, demolition, industrial or waste.

Preferably, the intermediate layer has the same thickness as the decorative layer. The intermediate layer can have a thickness that is larger or smaller than the thickness of the decorative layer.

Preferably, the reinforcing layer and, where utilized, the intermediate layer has substantially or completely the same shape and horizontal dimension as the decorative layer. Moreover, the decorative layer is overlapped to the reinforcing layer and, where available, the intermediate layer in order to cover and hide the reinforcing layer.

The intermediate layer can be bonded to the reinforcing layer, and to the support layer, or to the decorative layer by means of adhesive layers, for example a glue.

The glue used for bonding together the various elements of the floor element can be an epoxy glue, a hotmelt glue or a polyurethane based glue.

The inventors have found that the use of the intermediate layer is especially advantageous if a fiberglass layer is applied as reinforcing layer. If the fiberglass layer is disposed in between two ceramic tiles, very good results can be obtained in terms of impact resistance of the mechanically connected floor elements. The inventors have found that with that solution an impact resistance of 3.37 Nm (corresponding to a ball from 1524 mm) can be achieved. This is the case also when decorative layer and the intermediate layer both have a thickness of 6 mm or less. Hence, due to this solution it is possible to use thin ceramic tiles for floating floor covering while having extremely high values of impact resistance and/or of fatigue strength. In a preferred construction, the fiberglass layer is directly bonded to the ceramic decorative layer and to the ceramic intermediate layer, and the intermediate layer is directly bonded to the support layer. The direct bonding can take place by means of an adhesive or glue.

According to a preferred embodiment of the invention, the support layer is made of a material that is different from the material of the decorative layer. More particularly, the support layer is preferably made of a material adapted to be provided with coupling elements and/or made of a waterproof material and/or made of a compressible material.

In a first possibility, the support layer is made of a polymeric material. Polymeric materials have good mechanical properties in combination with relative low cost and low weight and, further, they provide for an impermeable and a sound reducing support layer.

Preferably, the support layer is made of a thermoplastic polymeric material, preferably with a glass transition temperature (Tg) less than 100° C., for example of PVC (polyvinyl chloride) or polyurethane, more particularly thermoplastic polyurethane. Forming the support layer out of a material with a relatively low glass transition temperature leads to a support layer which is easily compressed at room temperature. Compression is desirable in many respects. For example, a possible thermal expansion of the support layer may be partially or wholly suppressed by the more rigid or stiffer decorative layer and/or reinforcing element that holds the material of the support layer in its original dimension. Compression is also interesting for the design of the coupling elements and allows for a certain adaptation to unevenness of the subfloor, which in its turn prevents air chambers in between the support layer and the subfloor that may amplify walking noises.

In a preferred embodiment, the support layer is made either of a rigid or of a flexible PVC, wherein rigid PVC comprises an amount of plasticizer less than 15 phr, and flexible PVC comprises an amount of plasticizer of 15 phr or greater, preferably more than 20 or more than 25 phr. The support layer may also comprise a high amount of filler materials, such as chalk, e.g. more than 30 wt % or more than 60% wt of such filler materials. The fillers add weight to the support layer and make the support layer very effective in killing the transit of walking sound to lower quarters. Rigid PVC provides for a support layer having good dimensional stability when exposed to variation of the temperature. In other words, the expansion of the support layer, when exposed to high temperature, is limited thereby providing a good stability of the floor. A support layer made of flexible PVC has a lower dimensional stability, but is more easily compressed and therefor its tendency to expand will be suppressed at least to some extent by the decorative layer and/or the reinforcing element.

According to another embodiment, a support layer made of flexible PVC, or from any other material, thermoplastic or not, can be designed in such a way to compensate to variations of dimension due to variations of the temperature. For example, the support layer can be formed of a plurality of separated elements, for example strips, or the support layer can comprise grooves separating adjacent portions of the support layer thereby permitting the expansion of said portions without affecting the global stability of the floor.

In a second possibility, the support layer is made of fiber cement. The inventors have found that due to this solution the floor element has a high impact and fatigue strength in combination with high thermal stability so that the floor element does not significantly expand or contract when exposed to a temperature variation.

Furthermore, the support layer preferably has a thickness comprised between 2 mm and 7 mm, preferably 6 mm, more preferably about 3 mm or less. For example, a preferred embodiment of the invention provides for a support layer made of PVC and showing a thickness of 3 mm, thereby representing a good solution in terms of thermal stability, noise reduction, low weight and low cost. An alternative embodiment provides for a support layer made of fiber cement and having a thickness of 6 mm thereby providing a very good thermal stability.

Thus, the thickness of the floor element is lower than 20 mm, preferably 18 mm or less, more preferably 13 mm or less. In this way, the thickness of the resulting floor element is relatively thin, so that the impact of the floor in the environment is reduced, especially in case of restoration of existing flooring. Moreover, in this way, the weight of the floor element is limited so that the packaging, the transport and the installation are made easier.

As mentioned before, the support layer comprises edges with coupling elements. The coupling elements are configured to realize a mechanical coupling with coupling elements of an adjacent floor element. The term "mechanical coupling" refers to a coupling that allows adjacent floor elements to be coupled without the need for glue or the like. For example and not limitation, a mechanical coupling may be attained by means of profiled edge contours comprising coupling elements, mostly a male and a female part, that fit into each other.

The coupling elements preferably comprise at least a male part and at least a female part, wherein such male and female part in the connected state of two such floor elements have been engaged into each other. The male and the female parts are preferably at least partially formed in the support layer. For example, the male and/or female part may be wholly formed in said support layer.

Preferably, at least one male part is positioned at a first edge of the floor element and at least one female part is positioned at a second opposite edge of the floor element. Preferably, the male part projects outwardly in a horizontal direction from its respective edge, thereby forming a protrusion at said edge, while the female part preferably extends inwardly in a horizontal direction from its respective edge, thereby forming a recess at said edge. Said male and female part in a connected state of two similar floor elements engage into each other to create a mechanical coupling between the respective edges, preferably resulting in a locking between said edges at least in all horizontal directions in the plane of installed floor elements. According to an embodiment the engagement of male and female part results in a locking between the respective edges at least in the vertical direction perpendicular to the plane of installed floor elements.

The coupling elements are preferably configured to allow realizing a coupling by means of a movement of one floor element with respect to another adjacent floor element. Such movement may be a translational motion in a downward, e.g. vertical, direction; a translational motion in a horizontal direction, e.g. perpendicular to the edges; or an angling motion around a horizontal axis parallel to the edges. The respective motion then preferably results in the aforementioned male and female parts of adjacent floor elements becoming mutually engaged.

Preferably, the coupling elements are configured in such a way that the floor elements can be uncoupled by means of a translational motion in an upward, e.g. vertical, direction. To allow for a fluent uncoupling, the coupling elements are preferably at least partly, or wholly, provided in one piece in a support layer made from a flexible material, such as from a thermoplastic material with a Tg less than 100° C., preferably made from soft PVC. Such material will provide the coupling elements with a sufficient flexibility to become uncoupled even if some portions of the coupling elements are underneath one or more adjacent floor elements. Due to this solution a single floor element of the floor can be removed from the floor covering, in order to be substituted, without it being necessary to remove adjacent floor elements, so that replacement of a floor element is made easier by a preferred embodiment of the invention.

As used herein, the terms "horizontal" and "vertical" are basically expressed regarding a floor covering installed on a surface which is considered to be horizontal in its general meaning. Thus, when used regarding a single floor element which is a substantially flat element provided with a main plane, the terms "horizontal" and "vertical" are to be considered respectively equivalent to the terms "parallel with respect to the main plane of the floor element/installed floor elements" and "perpendicular with respect to the main plane of the floor element/installed floor elements".

In general, the coupling elements may be construed in several ways. Here below, two general possibilities for their construction are described, without excluding any further possibilities also falling under the scope of the present invention.

In a first general possibility for the construction of the coupling elements, the male part and the female part extend over a limited length portion of the related edge, wherein such limited length is smaller than the whole length of the related edge itself, preferably smaller than half the length of the related edge. In accordance with this possibility, the edges preferably comprise sections free from said male part and said female parts. As an alternative, male and female parts may alternate along the edge. Preferably, at said edge, the decorative layer is at least supported by the support layer over 30% of the length of the related edge. In this way, the risk of failure of the brittle material in the packaging or upon installation is reduced. According to the present first possibility, each edge can comprise one or more male part and/or one or more female parts. Preferably the male and female parts are disposed along such edge such that, upon choice of the installer, the floor elements can be installed in several patterns, for example a regular flanked pattern, a herringbone pattern and/or an offset pattern, for example a half-half offset pattern or a one third offset pattern. Preferably, the male part and/or the female parts are symmetrically, either mirror symmetrically or parallel symmetrically, disposed on the same edge with respect to the midpoint of the said edge. In the case of installation in a half-half pattern, the male and/or female parts preferably are disposed in the same manner along both halves of the respective edge. In the case of installation in a one third offset pattern, the male and/or female parts preferably are disposed in the same manner along all three thirds of the respective edge. As mentioned above, in an alternative embodiment, the male and female parts alternate each other on a same edge.

Geometries for coupling parts in accordance with the first possibility include cooperating male and female parts which in a top plan view are dovetail-shaped or male and female parts which in a top plan view resemble the connections of jigsaw puzzles.

In a second general possibility for the construction of the coupling parts, the male part and female part can be disposed substantially along the whole length of the related edge, for example, substantially defining the related edge. For example, according to this embodiment, the male and the female parts, can be basically shaped as a tongue and a groove that substantially run through the whole length of the related mutually opposite edges.

Preferably, the floor element comprises male parts and/or female parts with common geometry on all its edges, thereby allowing several installing patterns. According to different embodiments of the invention, the floor element can comprise male parts and/or female parts of differing geometries on the same edges or on different edges. For example, the floor element can comprise male parts and/or female parts of different shape or of different dimension on different edges. For example, a rectangular floor element can comprise first male parts and/or female parts of a first shape on the long edges and second male parts and/or female parts of a second shape on the short edges. Due to this solution, the floor element can be installed only according to specific selected patterns, thereby obtaining specific selected visual effects of the floor, and minimizing the occurrence of installation mistakes.

In a coupled condition of two of said adjacent floor elements, said coupling elements cooperate and preferably form locking surfaces limiting the mutual movement of said floor elements in a vertical and/or one or more horizontal directions.

For example, said locking surfaces can comprise first locking surfaces adapted to limit the mutual movement of said floor elements along the coupled edges. Due to this solution, the floor elements cannot slide one relative to the other, once they are coupled so that the installing of the floor covering is made easier. This is especially so when a pattern in the floor covering, such as a checkboard pattern or a half-half offset pattern is desired. The prevention or limiting of mutual movement of floor elements alongside each other at a first pair of edges is also of interest in the installed floor covering, since this may aid in maintaining the connection between a second pair of edges of adjacent floor elements, e.g. perpendicular thereto.

According to a preferred embodiment, said first locking surfaces are formed from the engagement of the male part into the female part. According to this example, said first locking surfaces are preferably at least formed by surfaces delimiting the male and female parts in a horizontal direction along the coupled edges or, in other words, said first locking surfaces are preferably at least formed such that they or their extensions are intersecting with said coupled edges.

Preferably, in a coupled condition of two adjacent floor elements, second locking surfaces are formed limiting the mutual movement of said floor elements in a direction perpendicular to the coupled edges and in a substantially horizontal plane. Preferably, the second locking surfaces are formed from the engagement of the male part into the female part. Preferably, the second locking surfaces are at least formed by surfaces delimiting the male and female parts in a horizontal direction perpendicular to the respective edge Such second locking surfaces may be formed according to a number of possibilities, of which, here below, three possibilities are described in more detail.

In a first possibility for the construction of said second locking surfaces, the second locking surfaces are coinciding with said first locking surfaces, in which case these surfaces have a normal with an orientation forming an angle with the direction of the respective edge, wherein this angle is lower than 90°, preferably between 20 and 70°. In particular, in accordance with a preferred embodiment of the invention, the first and the second locking surfaces are formed from the engagement of the male part into the female part and are both formed by surfaces delimiting the male part and female parts in a direction along the coupled edges or, in other words, said first and said second locking surfaces are at least formed by surfaces, which by themselves or their extensions intersect with said coupled edges. According to this preferred example, the male part and the female part, seen in a top planar view, may have a contour which is tapered toward its related edge. For example, the male part and the female part, as seen in a top planar view, can be dovetail shaped or show a couple of opposite sides, as seen in a direction along the edge, which are planar and/or curved, and which are converging to each other toward the related edge. In this way, in a coupled condition of the male part with the female part, said first and second locking surfaces are formed on said tapering or converging sides. In accordance with such embodiment, the male part may be shaped as a protrusion on the related edge (e.g., dovetail shaped), and the female part may be shaped as a matching recess on the opposite edge of the floor element.

In a second possibility for the construction of said second locking surfaces, the second locking surfaces are distinct or separate from said first locking surfaces. In accordance with this second possibility, the second locking surfaces can be at least formed by surfaces delimiting the male and female parts in a direction substantially perpendicular to the coupled edges. For example, according to said embodiment, the male and the female part, in a top planar view, can be T-shaped, with the head of the T forming the male part and engaging behind portions of the female part. According to another embodiment, the male part may be provided with one or more barbs engaging behind portions of the female part. Alternatively, in accordance with a third possibility the second locking surfaces can be formed by a vertically protruding part and a vertically recessed part engaging behind each other. For example, in the case the coupling parts are basically shaped as a tongue and a groove, the tongue may be provided with a downwardly directed protrusion and the groove may be provided with a cooperating therewith recess.

The coupling elements may be configured in such a way that, in a coupled condition of two adjacent floor elements, only one set of said first and/or second locking surfaces is formed limiting the mutual movement of said floor elements in one substantially horizontal direction perpendicular and/or along the coupled edges, although it is preferred that in said coupled condition at least two sets of said first locking surfaces and/or second locking surfaces are formed wherein said sets limit the movement in mutually opposite horizontal directions perpendicular and/or along the coupled edges.

Due to this solution, the coupling elements are easily and conveniently shaped to limit the movement in substantially all the horizontal directions thereby providing a strong locking between the tiles.

Furthermore, the coupling elements preferably comprise vertical locking elements configured in such a way that in a coupled condition of two adjacent floor elements third locking surfaces are formed limiting the mutual movement of said floor elements in a substantially vertical direction. Due to this solution, the floor elements can fluently be installed without the occurrence of unacceptable height differences between adjacent floor elements. Moreover, the floor elements are solidly coupled to each other to improve the fatigue behavior of the floor covering. Further, by limiting relative movement of the floor element, it is possible to reduce the step noise effect, i.e. reduce the noise generated at every step.

Preferably, the vertical locking elements are provided along substantially the whole length of the coupled edges, although they can extend over limited portions of said coupled edges only, e.g. only there where a male or female part is present.

In particular, said third locking surfaces can be at least formed by an upwardly facing surface positioned on one of the coupled floor elements and, a cooperating therewith, downwardly facing surface on the other coupled floor element. In other words, the third locking surfaces are provided on surfaces or planes substantially horizontal or inclined with respect to the horizontal plane and forming an angle with the horizontal plane which is less than 90°, preferably less than 70°, more preferably less than 50°, for example 15° or less, or 0°, in other words horizontal.

Third locking surfaces may be construed in accordance with several different possibilities, of which here below three are briefly described.

According to a first possibility, said vertical locking elements comprise a hook-shaped element having a first portion extending from its respective edge in a substantially horizontal direction and a second portion extending downwardly from the first portion in a substantial vertical direction. Said hook-shaped element further comprises a protruding portion placed on the second portion that is shaped to define at least an upwardly facing surface which in use is adapted to cooperate with a downwardly facing surface provided on the adjacent floor element thereby forming said third locking surfaces. For example, the downwardly facing surface is provided in the form of a chamfered lower edge of the support layer, so that it defines an abutment surface for the protruding portion of the hook shaped element.

The hook-shaped element can be at least partially positioned on the male part, on the female part or on sections of the edge next to the male or the female part or can be provided on both the male or female part and on said sections next to the male or the female part. In a preferred case, the hook-shaped element is provided on the sections of the edge next to the female part and on the male part, preferably on a side of the male part which is substantially parallel to the coupled edges.

According to a second possibility, the male part protrudes outwardly beyond an upper edge of the decorative layer and the female part extends inwardly beyond an upper edge of the decorative layer to thereby form an undercut underneath said decorative layer so that the third locking surfaces may be at least formed by a top surface of said male part and an upper surface of the undercut formed by said female part, preferably a bottom surface of the decorative layer delimiting said undercut in an upward direction.

According to a third possibility, the third locking surfaces can be at least formed by cooperating surfaces on the bottom of said male part and a cooperating therewith portion of said female part, for example an upwardly facing surface of the female part. This third possibility may be attained by means of an embodiment also showing the characteristics of the first possibility, wherein the hook shaped portion is available at the female part, and wherein the second portion of said hook forms said upwardly facing surface.

In a preferred embodiment, said vertical locking elements are such that in a coupled condition of two floor elements two sets of third locking surfaces are formed, wherein said sets limit the movement in mutually opposite vertical directions, although it is possible that only one set of third locking surfaces is formed limiting the movement in only one vertical direction. In this way, the relative movement of the floor elements in the vertical direction is substantially prevented. Furthermore, in this way a very good vertical relation is obtained between adjacent floor elements. This solution may further lead to a reduction of the step noise. In a preferred embodiment, the two sets of third locking surfaces lie on planes that are inclined relative to each other, preferably orthogonal.

Two sets of third locking surfaces may be attained in a number of different manners, of which here below a first and a second possibility are described.

In accordance with a first possibility, sets of third locking surfaces limiting the movement in mutually opposite vertical directions are sequentially, and preferably alternatingly, disposed one after the other in a direction along the coupled edges. In other words, the sets of third locking surfaces limiting the movement in mutually opposite vertical directions are available on subsequent portions of the coupled edges. It is not excluded that such portions may partially overlap. By way of example, a first edge is provided with the hook-shaped element on the male part and with the chamfered lower edge on the sections of the edge next to the male part and an opposite second edge is provided with the hook-shaped element on the sections of the edge next to the female part and the female part with the chamfered lower edge, so that in a coupled condition of said floor element with an adjacent similar floor element both the sets of third locking surfaces are formed along the same coupled edges. Due to this solution, a very simple design of the vertical locking elements can be used thereby allowing a reduction of the thickness of the support element. The inventors have found that due to this solution the lower support element can show a thickness comprised between 2 mm and 4 mm, for example 3 mm or less.

Preferably, a first set of third locking surfaces is positioned on a first line parallel to the coupled edges and a second set of the third locking surfaces is positioned on a second line parallel to the coupled edges, and said first and second line are distinct on the horizontal plane. For example, a first set of third locking surfaces is formed by the engagement of the male part into the female part, while the second set of third locking surfaces is formed by the engagement of the sections of the edge beside the male part with the sections of the edge next the female part. Due to this solution the floor element can be easily manufactured to be provided with the two sets of third locking surfaces. In fact, on a single floor element the upwardly facing surface for a first set can be manufactured by means of a specific processing different from the processing for manufacturing the downwardly facing surfaces of the other set. For example, on a first edge of one floor element two different milling processes may be used, wherein these milling processes can be conducted contemporarily and acting on different parallel lines in order to manufacture the hook shaped element and the chamfered edge.

In accordance with a second possibility, said two sets of third locking surfaces can be disposed in succession one after the other in a substantially vertical direction, or in other words, be present in one and the same cross-section taken along the respective edge. By way of example, the male part is in the form of a tongue and the female part is in the form of a groove and the two sets of third locking surfaces are at least formed respectively by a bottom surface of the tongue cooperating with an upwardly facing surface of the groove, and an upper surface of the tongue and a cooperating therewith downwardly facing surface of the groove. Alternatively, in accordance with said second possibility, the hook shaped element is disposed beneath an upper edge of the floor element so that a C-shaped recess is formed between the protruding portion of the hook shaped element and the upper edge, e.g. between the protruding portion of the hook shaped element and the lower surface of the decorative layer, so that in a coupled condition the chamfered edge of the adjacent floor element is at least partially inserted in the C-shaped recess thereby forming two sets of third locking surfaces. Particularly, a first set of third locking surfaces is formed by the protruding portion of the hook shaped element which cooperates with the chamfered edge, while a second set of third locking surfaces is formed by upper surface of the support layer provided with the chamfered edge and the upper surface of the C-shaped recess, e.g. the lower surface of the decorative layer.

The first, second and/or third locking surfaces can comprise portions positioned on resilient arms. Such resilient arms may be adapted to be bent when the floor elements are being coupled together. In a special embodiment, the resilient arms maintain a bent position in the coupled state. In the latter case, these resilient arms may exert a reaction force which forces the floor elements towards each other so that the relative movement of the floor element in a vertical and/or in one or more horizontal directions is limited. The resilient arms can be provided either on the male part or on the female part as well as on the sections of the edge beside the male and female parts. Due to the resilient arms, the floor elements may be more easily coupled and/or may be solidly coupled to each other in order to improve the fatigue behavior of the whole floor. Further the resilient arms can be bent following a thermal expansion of the related coupling element of the adjacent floor element thereby allowing thermal expansion of the floor elements without affecting the stability of the floor.

Preferably, the first and/or second locking surfaces comprise portions positioned on first resilient arms and the third locking surfaces comprise portions positioned on second resilient arms. According to an embodiment, the first resilient arms extend substantially in the horizontal plane and are adapted to bend in said horizontal plane. The first resilient arms can delimit the male part and/or the female part in a direction along the coupled edge. For example, in a preferred embodiment the female part comprises two first resilient arms delimiting the recess, which forms the actual female part itself, in both mutually opposite horizontal directions along the respective edge. Preferably, the second resilient arms extend in a direction which is substantially vertical and are adapted to bend in a direction substantially horizontal. For example, the second resilient arms at least partially delimit the said coupling elements in a direction substantially perpendicular to the related edge. In the preferred example the hook shaped element, and more in particular the second portion of the hook shaped element, substantially defines such second resilient arm. It is of course not excluded that the first and/or second locking surfaces comprise portions positioned on a same resilient arm.

In a coupled condition of two of said floor elements preferably an intermediate distance is available between the respective upper edges of adjacent floor elements. Preferably, the decorative layer is mounted on the support layer in such a way that when the floor elements are in a coupled condition said intermediate distance is available between the edges of adjacent decorative layers, while the edges of the underlying support layer are coupled to each other by means of the available coupling elements. Due to this solution slight dimensional variations of the decorative layer of adjacent tiles may be tolerated. In the cases where the decorative layer is formed by one or more ceramic tiles, unrectified tiles may be selected. Even when rectified tiles would be selected, an intermediate distance of at least 1.5 millimeter is preferred. In general, with brittle decorative layers, direct contact between the edges of the decorative layers of adjacent floor elements is best to be prevented in order to minimize the risk of breaking off edge portions upon installation, or upon use of the floor covering. The prevention of direct contact between the edges of the decorative layers also prevents squeaking noises from generating when the floor is walked upon. Further some decorative layers and/or support layers may expand or contract due to thermal variation. The available intermediate distance prevents that such expansion and contraction affects the stability of the floor.

The intermediate distance, or gap, between the decorative layers of adjacent floor elements can be further finished in several possible ways.

According to a first possibility, said intermediate distance between the floor elements can be filled by a grout thereby providing an impermeable floor covering. Preferably a polymeric grout is used.

In a second possibility, the decorative layer can be at least partially, preferably completely, surrounded by a gasket so that in a coupled condition of two adjacent floor elements said gasket is compressed by the decorative layer of an adjacent floor element so to form a substantially water tight connection between the floor elements.

It is noted that the characteristic that the floor element comprises coupling elements that in a coupled condition with an adjacent floor element form first, second and third locking surfaces for limiting the relative movement of the floor element, forms an inventive idea irrespective of the presence of a decorative layer and, in particular, irrespective of the material constituting the decorative layer. Hence, the present invention, according to a second independent aspect, provides for a floor element for forming a floor covering wherein the floor elements comprise edges provided with coupling elements adapted to cooperate with coupling elements of an adjacent similar floor element in said floor covering, wherein the coupling elements comprise at least one male part and at least one female part, wherein in a coupled condition of two of said adjacent floor elements first locking surfaces are formed limiting the mutual movement of said floor elements along the coupled edges, as well as second locking surfaces limiting the mutual movement of said floor elements in a direction that is substantially horizontal and perpendicular to the coupled edge, and third locking surfaces limiting the mutual movement of said floor elements in a direction that is substantially vertical, wherein in said coupled condition two sets of third locking surfaces are formed, wherein said sets limit the movement in mutually opposite vertical directions. The inventors have found that due to this solution the floor elements can be solidly coupled to each other thereby forming a floor covering with good fatigue behavior. Further, by preventing relative movement of the floor elements it is possible to reduce the step noise effect, i.e. reduce the noise generated at every step.

The coupling elements together with the first, second and third locking surfaces are preferably formed in accordance with the preferred embodiments of the first aspect of the present invention, though without the floor elements necessarily having a decorative layer and/or support layer as described in the first aspect.

According to a third independent aspect of the invention, there is provided a floor covering comprising a plurality of adjacent floor elements, wherein each floor element comprises a decorative layer of ceramic material and a support layer disposed below the decorative layer, wherein the floor covering comprises the combination of the following features: at least one floor element comprises a reinforcing layer in between the decorative layer and the support layer; the floor elements comprise coupling means configured to realize a coupling with coupling elements of adjacent floor elements; the floor covering comprises a grout filling an intermediate distance separating the decorative layers of the floor elements. Preferably the floor elements are separated from a subsurface, for example the subfloor, i.e. they are not bonded to the subsurface by means of adhesive or mechanical means. Due to this solution is provided a floor covering composed of floor elements installed without using of adhesive, that shows a high satisfying impact and fatigue strength, and is totally impermeable. By means of the third aspect, the inventors have finally offered a solution to a long-felt need in the ceramic flooring world. They have provided an easy to be installed ceramic tile flooring, with a good impact strength and waterproofness. The floor elements of the first aspect, and the preferred embodiments thereof, may be used to form a floor covering in accordance with the present third aspect.

According to a preferred aspect of the invention the floor covering comprises an under-layer disposed beneath the floor elements that is configured to act as a moisture barrier. Due to this solution it is possible to prevent the forming of mold underneath the floor elements. In combination or as an alternative to this solution, the under-layer can be configured to act as a noise barrier thereby reducing the noise generated by steps on the floor.

BRIEF DESCRIPTION OF THE DRAWINGS

With the intention of better showing the characteristics of the invention, in the following, as an example without any limitative character, several preferred forms of embodiments are described with reference to the accompanying drawings, wherein:

FIG. 1 shows an embodiment of a floor element of the invention;

FIG. 4 on a larger scale shows a view on the area F4 indicated on FIG. 3;

FIG. 6, on a larger scale, is a top plane view of the floor element of FIG. 1 wherein the decorative layer is represented in dashed line;

Figures 7, 12, 13, 14:
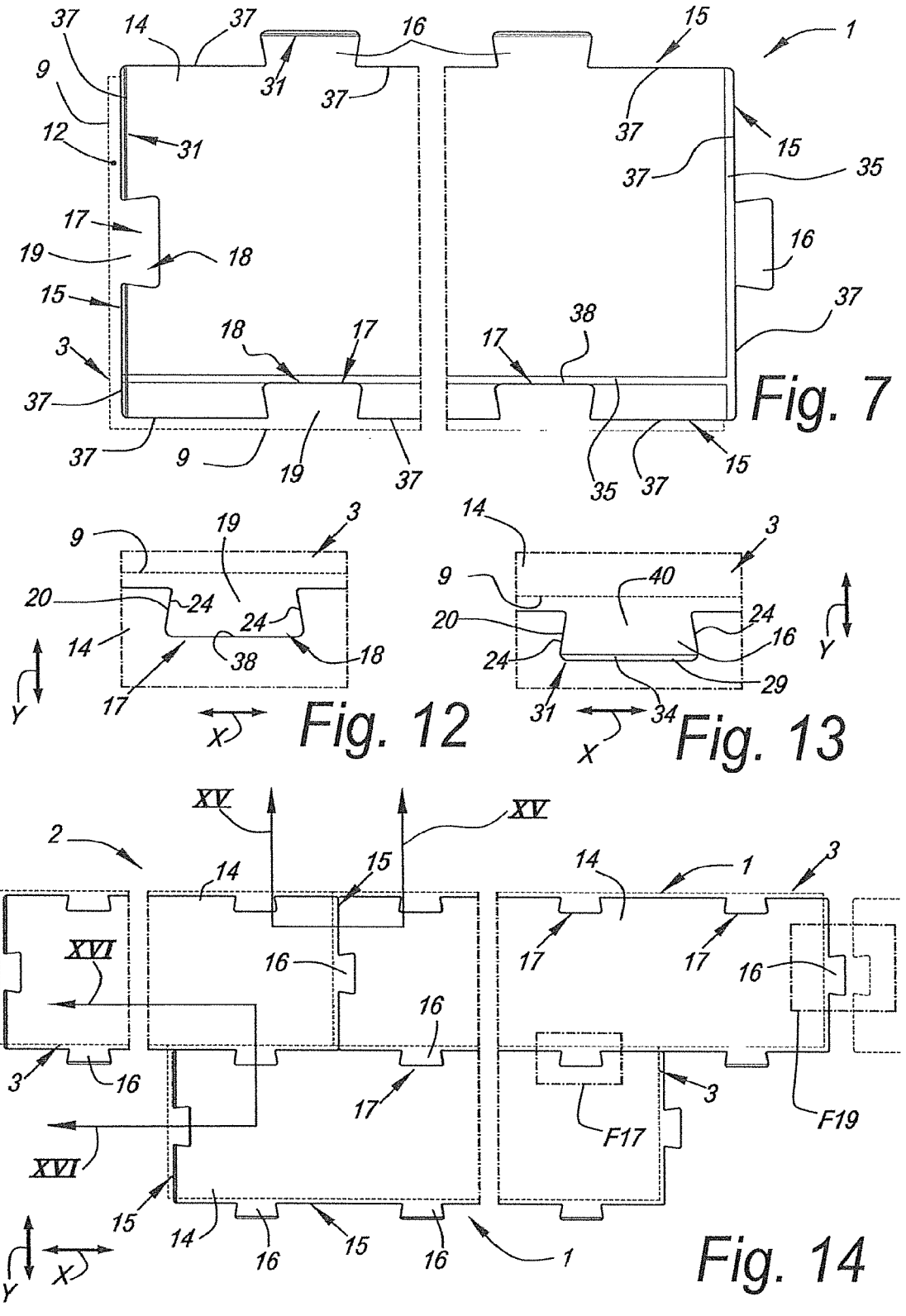
FIG. 7, on a still larger scale, is a bottom view of FIG. 6.
Figures 8, 9, 10, 11:
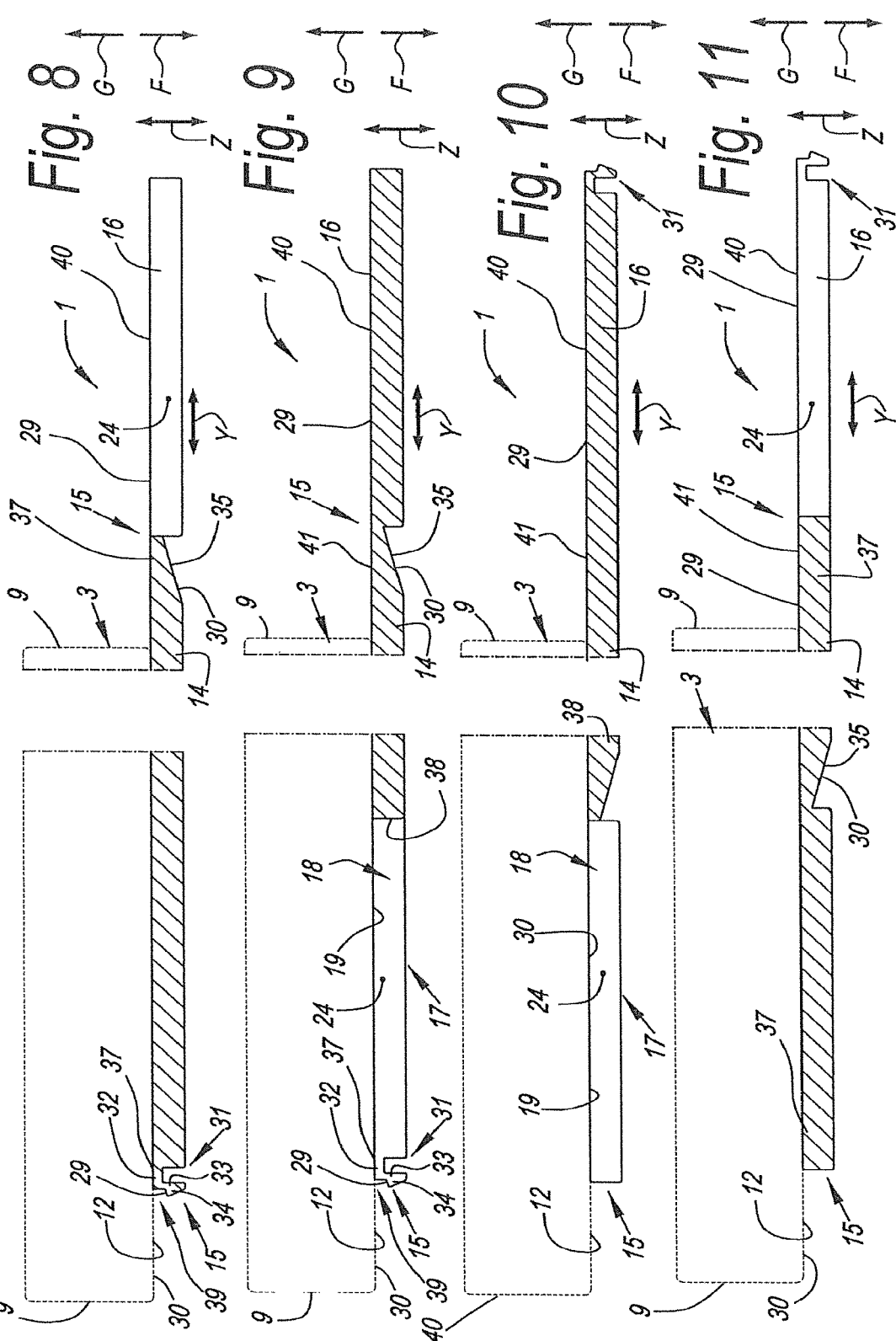
Figures 15, 17, 18:
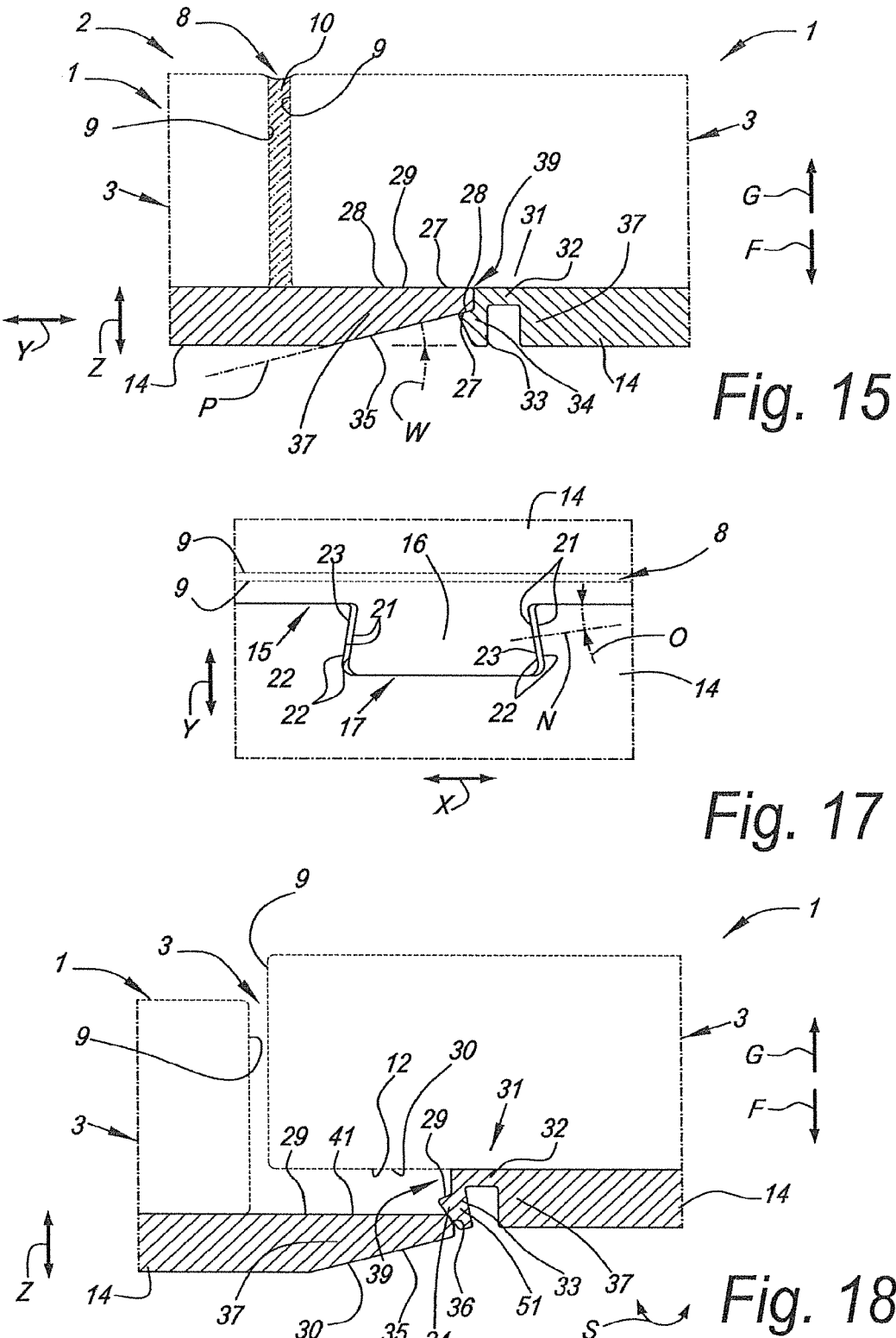
Figure 16:
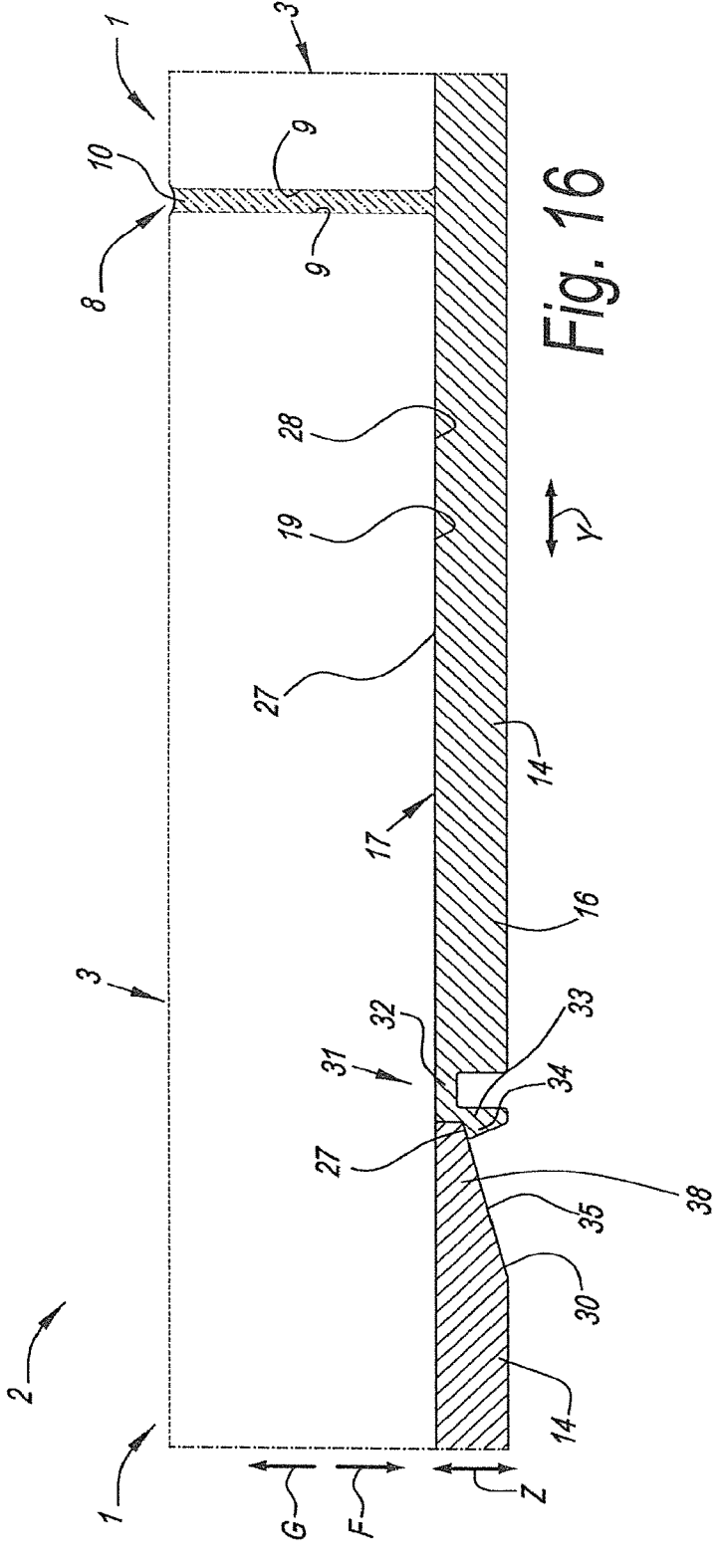
Figures 19, 20, 21, 22, 23, 24, 25, 26, 27, 28:
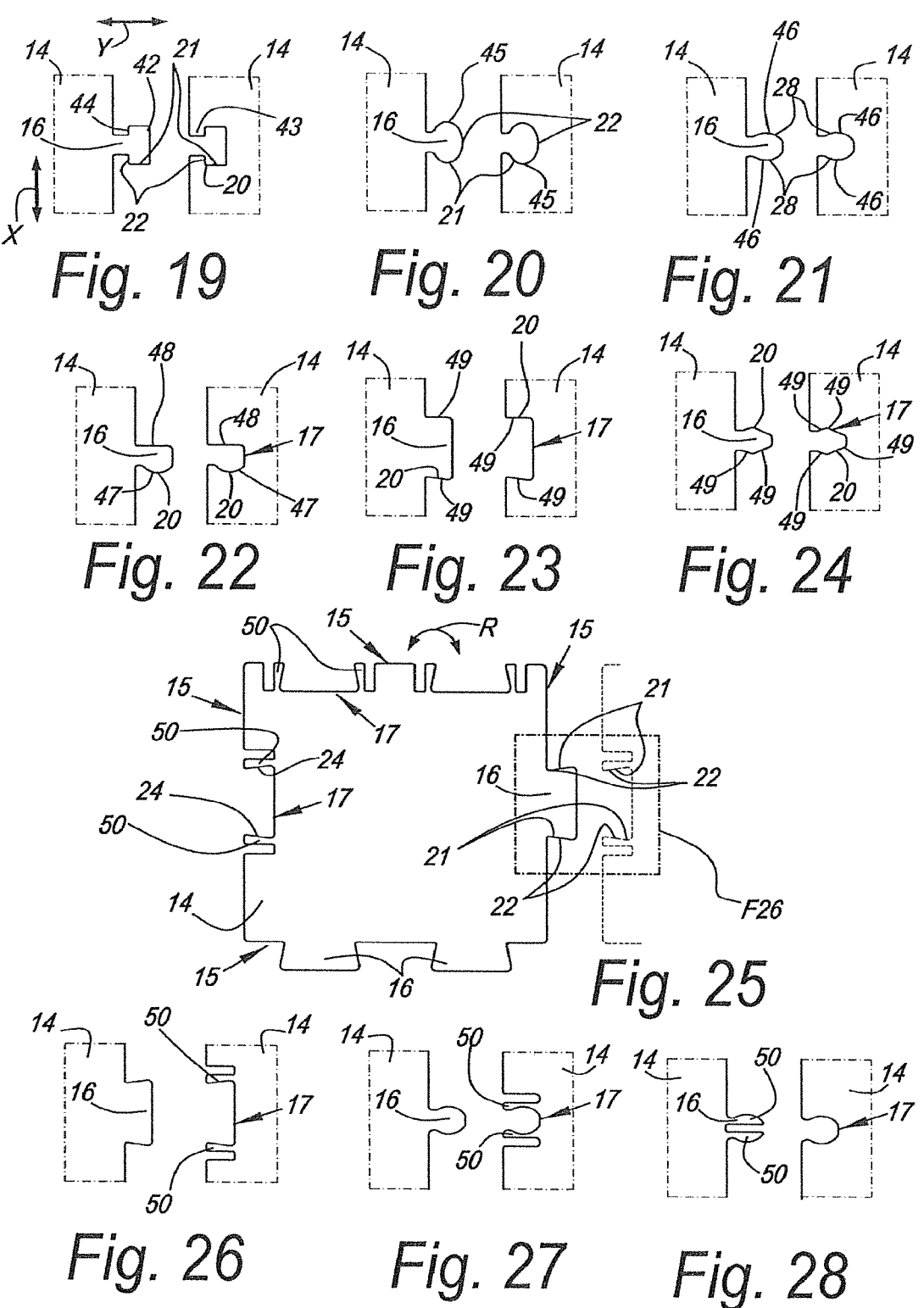
Figures 29, 30, 31, 32:
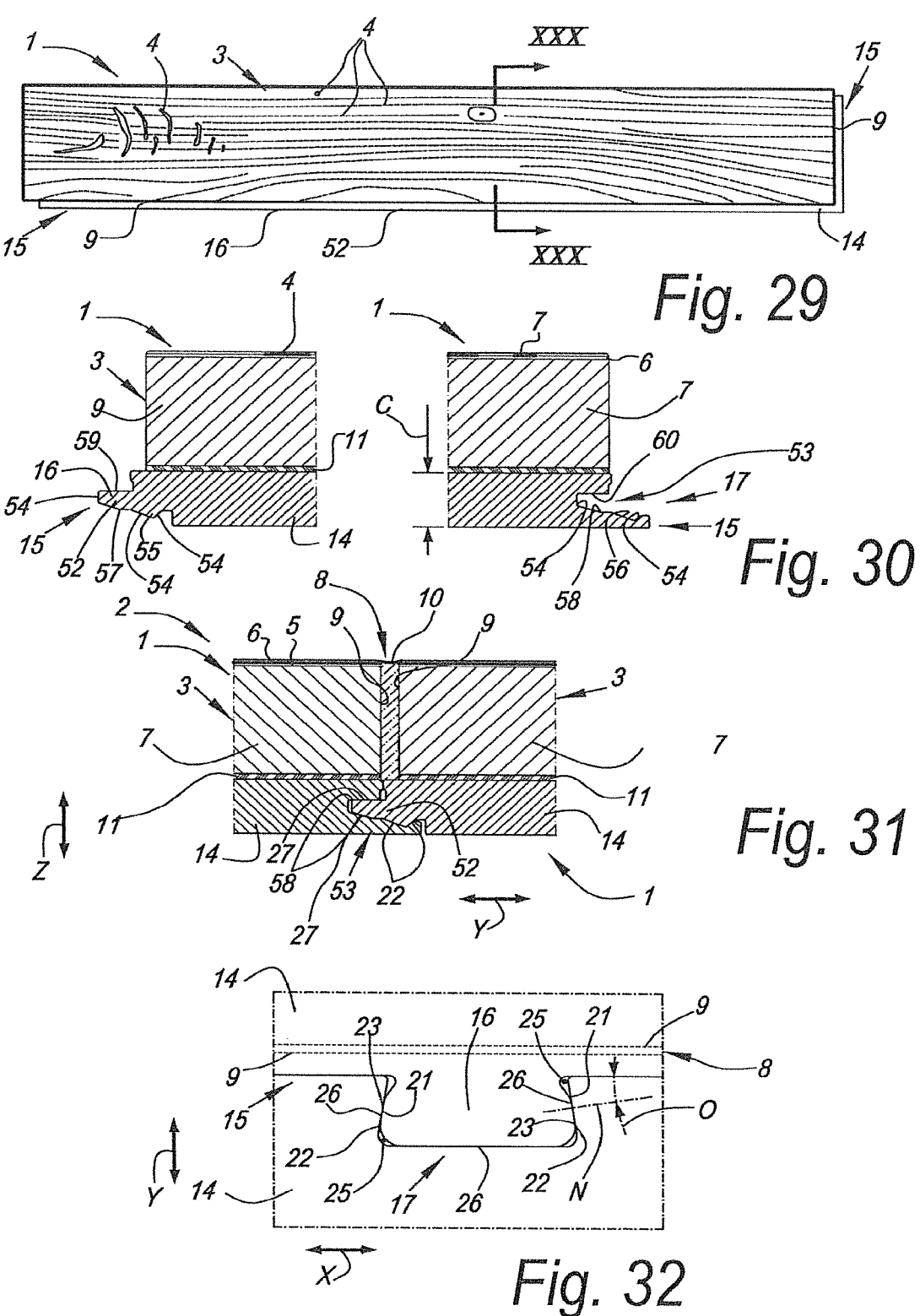

FIG.S from 8 to 11 show on a larger scale the cross sections respectively along the lines VIII-VIII, IX-IX, X-X and XI-XI indicated in FIG. 6;

FIGS. 12 and 13 are on a larger scale show views on the areas respectively F12 and F13 indicated on FIG. 6;

FIG. 14 is a top view of a floor covering assembled from the floor elements of FIG. 1, wherein the decorative layers of the floor elements are represented in dashed lines;

FIGS. 15 and 16 on a larger scale show the cross sections respectively along the lines XV-XV and XVI-XVI of FIG. 14;

FIG. 17 on a larger scale shows a view on the area F17 indicated on FIG. 14;

FIG. 18 on a larger scale show the cross sections along the lines XV-XV of FIG. 14 according to a variant of the invention during a coupling motion of the floor elements;

FIGS. from 19 to 24 on a larger scale give views on the area indicated with F19 in FIG. 14, for variants of the male and the female parts;

FIG. 25 is a top view of a variant of the support layer;

FIGS. from 26 to 28 give views on the area indicated with F26 on FIG. 25 for variants of the male and the female parts;

FIG. 29 is a top view of a floor element according to a variant;

FIG. 30 on a larger scale shows the cross section along the line XXX-XXX of FIG. 29;

FIG. 31 shows a cross section of a coupled condition of two floor elements in accordance with FIG. 29; and FIG. 32 in a view similar to that of FIG. 17 shows a variant.

DETAILED DESCRIPTION OF PREFERRED EMBODIMENTS OF THE INVENTION

Figures 2, 3, 5:
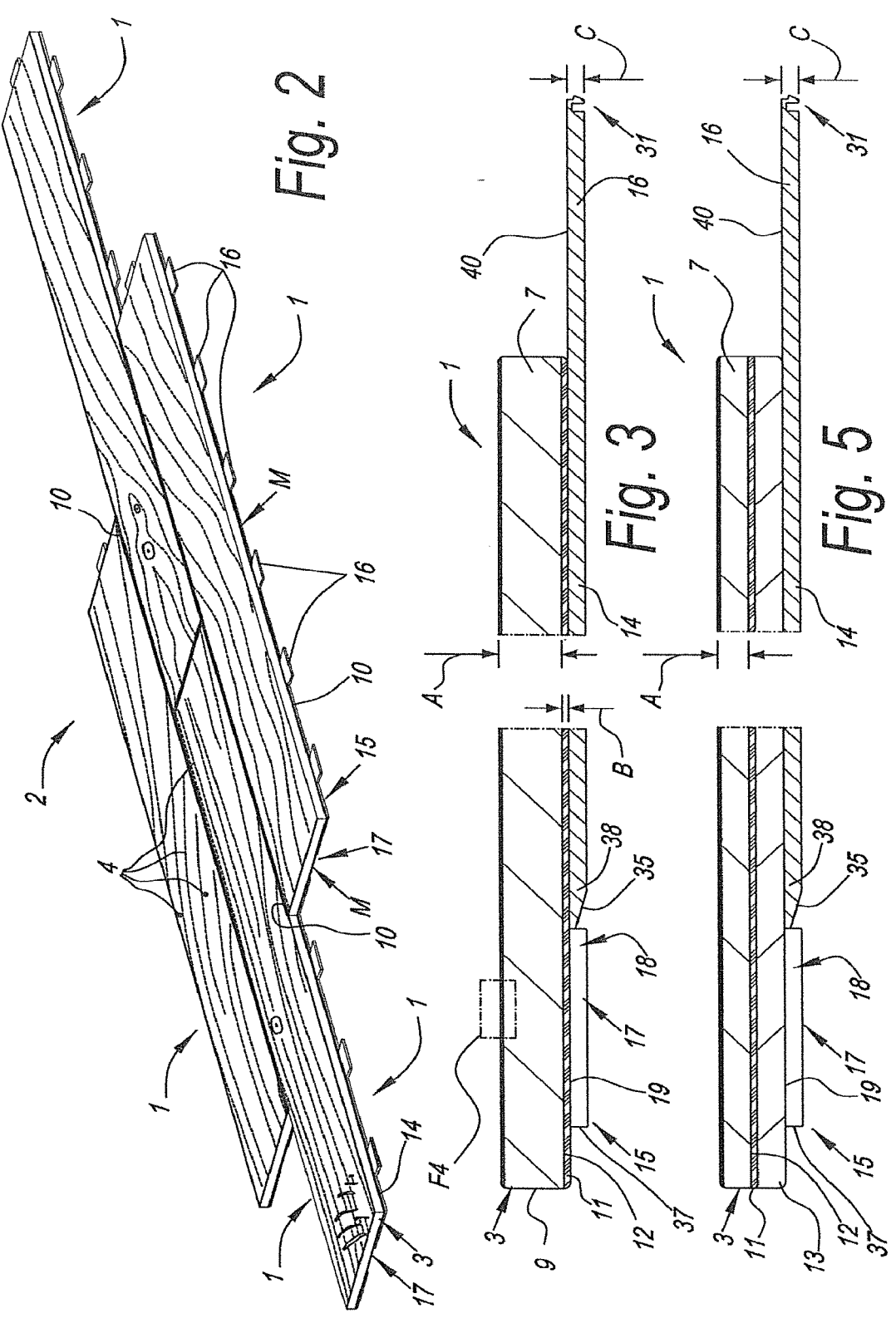
FIG. 2 shows a perspective view of a floor covering formed by a plurality of floor elements according to FIG. 1.
FIG. 3 on a larger scale shows a cross section along the line of FIG. 1.
FIG. 5 in the same view as FIG. 3 shows a floor element in accordance with a variant of the invention.

FIG. 1 shows a floor element 1 for forming the floor covering 2 of FIG. 2. The floor element 1 is adapted to be installed on a subsurface (not shown). The floor element 1 is configured to be coupled to one or more adjacent floor elements 1, preferably according to a predetermined pattern, for forming the floor covering 2. In the example shown in FIG. 2, the floor covering 2 shows an irregular offset pattern.

Referring to FIGS. 1, 3 and 4, the floor element 1 comprises a decorative layer 3 provided with a décor on its upper surface. In the example shown, the decorative layer 3 is rectangular and oblong in shape and is provided with a wood grain print 4 depicting wood grain lines extending globally in the longitudinal direction of the rectangular decorative layer 3. According to the present embodiment, the print 4 is digitally printed, for example by means of ink-jet printing.

As visible from FIG. 4, the decorative layer 3 comprises a background coating 5 covering at least partially its upper surface and adapted to receive the print 4 on its top. Preferably, the background coating is white, beige or brown or made of any color suitable to receive the print 4 on its top.

In the example shown in FIG. 4, the decorative layer 3 also comprises a protective coating 6 covering at least partially its upper surface and adapted to be placed above the décor, i.e. above the print 4. Preferably, the protective coating 6 is transparent or translucent.

In the embodiment shown in FIGS. 1, 3 and 4, the decorative layer 3 comprises a ceramic body 7, preferably made of porcelain. The background coating 5 and the protective coating 6 comprise glazes applied on the upper surface of the ceramic body 7.

With reference to FIGS. 15 and 16, the floor covering 2 comprises intermediate spaces 8 that are formed between the upper edges 9 of the floor elements 1, more particularly between the edges of the decorative layer 3, in this case between the edges of the porcelain tiles. As visible also in FIG. 2, said intermediate space 8 is filled with a grout 10, for example an epoxy grout, so that the floor covering 2 is perfectly impermeable and thus moisture, as well as dust or dirt, cannot pass from the upper surface of the floor covering 2 to the subsurface or vice versa.

As visible from FIG. 3, the floor element 1 comprises a reinforcing layer 11 disposed beneath the decorative layer 3, preferably directly bonded to the lower surface 12 of the decorative layer 3, e.g. to the lower surface of the ceramic body 7, for example by means of a glue.

By way of example, in the present embodiment, the reinforcing layer 11 is a metal plate, preferably made of steel, and is configured to establish a compressive state in the decorative layer 3. According to this embodiment, the metal plate defining the reinforcing layer 11 has a coefficient of thermal expansion higher than the coefficient of thermal expansion of the decorative layer 3, for example of the ceramic body 7. Preferably, the reinforcing layer 11 is heated to a stretched state, then the reinforcing layer 11 is bonded to the decorative layer 3 while it is still in the stretched state and subsequently it is cooled down to retract and put the decorative layer 3 in compression.

In the preferred embodiment shown in FIGS. 1, 3 and 4, the decorative layer 3 has a thickness A of greater than 7 mm, preferably approximately 10 mm, and the reinforcing layer 11 is a steel plate having a thickness B of 0.2 mm.

FIG. 5 shows a different embodiment of the invention wherein the floor element 1 comprise an intermediate layer 13 disposed beneath the reinforcing layer 11, so that the reinforcing layer 11 is disposed between the decorative layer 3 and the intermediate layer 13. The intermediate layer 13 is directly bonded to the lower surface of the reinforcing layer 11, for example by means of a glue.

According to this alternative embodiment, the intermediate layer 13 is preferably made of the same material of the decorative layer 3, for example comprises a ceramic body, preferably made of porcelain.

The intermediate layer 13 preferably has the same thickness as the decorative layer 3. According to this alternative embodiment, the thickness A of the decorative layer 3 can be less than 7 mm, preferably about 6 mm.

Preferably in the alternative embodiment of FIG. 5, the reinforcing layer 11 comprises a fiberglass layer, for example comprises a fiberglass mat.

As visible from e.g. FIGS. 1 and 3 the floor element 1 also comprises a support layer 14 arranged below the decorative layer 3, such that the reinforcing layer 11 is disposed in between the decorative layer 3 and the support layer 14.

Referring now to FIGS. 6 and 7, the support layer 14 has a shape basically corresponding to the decorative layer 3, e.g. rectangular and oblong in shape. In addition, the decorative layer 3 is mounted on the support layer 14 in such a way that, in a coupled condition of two of said floor elements 1 the intermediate distance 8 is available between the edges 9 of adjacent decorative layers 4. In the example shown in FIGS. 6 and 7, the decorative layer 3 is mounted on the support layer 14 in an offset relation in such a way that the decorative layer 3 and the support layer 14 are only partially overlapped in a plane view. For example, the support layer 14 comprises a couple of consecutive edges 15 that, in a top plane view, protrude outwardly with respect to the decorative layer 3, and a couple of opposite consecutive edges 15 that are at least partially placed beneath the decorative layer 3.

In the present embodiment, the support layer 14 is a coherent element, wherein the support layer 14 preferably covers the majority, i.e. at least 50 percent, of the lower surface 12 of said decorative layer 3. Preferably, the support layer 14 covers 80 percent or more of the lower surface 12 the decorative layer 3.

In the present embodiment, the support layer 14 is made of a polymeric material, preferably a thermoplastic polymeric material, preferably with a glass transition temperature (Tg) below 100° C., for example of PVC (polyvinyl chloride).

For example, the support layer 14 has a thickness C comprised between 2 and 7 mm, preferably about 3 mm or less.

As shown in FIGS. 6 and 7, the edges 15 of the decorative layer 10 are provided with coupling elements 16, 17, 31, 35 configured to realize a mechanical coupling with coupling elements 16, 17, 31, 35 of an adjacent floor element 1. The coupling elements 16, 17, 31, 35 preferably comprise at least a male part 16 and a female part 17, wherein such male 12 and female part 17 in the connected state of two floor elements 1 have been engaged into each other. The male part 16 and the female part 17 are preferably at least partially formed in the support layer 14. For example, the male part 16 and the female part 17 are wholly formed in said support layer 14.

The male part 16 projects outwardly and horizontally beyond its edge 15, thereby forming a protrusion at said edge 15, while the female part 17 extends inwardly and horizontally beyond its edge 15, thereby forming a recess 18 at said edge 15. Preferably, the male part 16 is positioned at a first edge 15 of the floor element 1 and the female part 17 is positioned at a second opposite edge 15 of the floor element 1.

As shown in FIGS. 3, 6 and 7, the male part 16 protrudes outwardly beyond an upper edge 9 of the decorative layer 3, and the female part 17 extends inwardly beyond an upper edge 9 of the decorative layer 3, to thereby form an undercut 19 underneath said decorative layer 3.

For example, in the preferred embodiment shown in FIGS. 6 and 7, and as indicated in FIGS. 15 and 16, said male part 16 and female part 17 can be engaged together by means of a translational motion F in a downward vertical direction of one of said adjacent floor elements 1 towards the other. More preferably, the coupling elements 16, 17, 31, 35, in particular the male part 16 and the female part 17, are configured in such a way that the floor elements 1 can be uncoupled by means of a translational motion G in upward vertical direction.

As shown in FIG. 6, the male part 16 and the female part 17 extend over a limited length portion L of the related edge 15, wherein such limited length L is smaller than the whole length of the related edge 15 itself. In this way, the edges 15 comprise sections 37 free from said male parts 16 and said female parts 17. According to this embodiment, each edge 15 can comprise one or more male parts 16 and/or female parts 17. Preferably, the male part 16 and/or the female parts 16 are symmetrically disposed on the same edge 15 with respect to the midpoint M of the said edge 15. In the example of FIGS. 6 and 7, one male part 16 and one female part 17 are provided respectively on opposite short edges 15 of the support layer 14, while a plurality of male parts 16 and of female parts 17 are provided on opposite long edges 15 of the floor element 1.

Moreover, in the preferred embodiment shown in FIGS. 6 and 7, the floor element 1 comprises male parts 16 and female parts 17 with common geometry on all its edges 15.

FIGS. 12 and 13 show male parts 16 and the female parts 17 which in a top plane view are dovetail shaped such that they have a contour 20 which is tapered toward its related edge 15. For example, the male part 16 and the female part 17, as seen in a top planar view, show a couple of opposite sides 11, as seen in a direction X along the edge 15, which are planar and/or curved, and which are converging to each other toward the related edge 15.

In a coupled condition of two of said adjacent floor elements 1, said coupling elements 16, 17, 31, 35 cooperate and form locking surfaces 21, 22, 17 limiting the mutual movement of said floor elements 1 in a vertical direction Z and/or one or more horizontal directions X, Y.

In the present embodiment, with specific reference to FIGS. 14 and 17, the coupling elements 16, 17, 31, 35 cooperate and form first locking surfaces 21 adapted to limit the mutual movement of said floor elements 1 in a direction X along the coupled edges 15, as well as second locking surfaces 22 limiting the mutual movement of said floor elements 1 in a direction Y perpendicular to the coupled edges 15 and in a substantially horizontal plane. According to this embodiment, the first and the second locking surfaces 21, 22 are coinciding, and in this case, these first and second locking surfaces 21, 22 have a normal N with an orientation forming and angle O with the direction X of the respective edge 15, wherein this angle O is less than 90°, preferably between 20° and 70°.

Preferably, in said coupled condition of the floor elements 1, two sets 23 of said first locking surfaces 21 and second locking surfaces 22 are formed, wherein said sets 23 limit the movement in mutually opposite horizontal directions X, Y perpendicular and along the coupled edges 15.

As shown in FIG. 17, said first and second locking surfaces 21, 22 are formed from the engagement of the male part 16 into the female part 17 and are both formed by surfaces 24 delimiting the male parts 16 and female parts 17 in a direction 24 along the coupled edges 15 or, in other words, said first and said second locking surfaces 21, 22 are at least formed by surfaces 24 intersecting with said coupled edges 15.

FIG. 17 also shows that, in the coupled condition, between the male part 16 and the female part 17 a gap 25 is formed to simplify the installation of the floor elements 1. In fact, due to this arrangement the contact surfaces 26 along the coupled edges 15 of the floor elements 11 are reduced so that a lower force is needed to couple the floor elements 1 together. This arrangement, is particularly useful when the decorative layer 3 comprise the ceramic body 7 because the risk of breakage of the decorative layer 3 is significantly reduced since it is not needed to provide a high force on the decorative layer 3 for coupling the floor elements 1, for example by means of a hammer or in any other way.

With specific reference to FIGS. 8-11, 15 and 16, the coupling elements 16, 17, 31, 35 also comprises vertical locking elements 31, 35 configured in such a way that in a coupled condition of two adjacent floor elements 1 third locking surfaces 27 are formed limiting the mutual movement of said floor elements 1 in a substantially vertical direction Z. Preferably, said vertical locking elements 31, 35 are such that in a coupled condition of two floor elements 1 two sets 28 of third locking surfaces 27 are formed, wherein said sets 28 limit the movement in mutually opposite vertical directions Z.

In particular, said third locking surfaces 27 are at least formed by an upward faced surface 29 positioned on one of the coupled floor elements 1 and cooperating with a downward faced surface 30 on the other coupled floor element 1. In other words, the third locking surfaces 27 are provided on planes P substantially horizontal or inclined with respect to the horizontal plane and forming an angle W with the horizontal plane which is less than 90°, preferably less than 70°, more preferably less than 50°, for example 15° or less, or 0°.

In the present embodiment said vertical locking elements 31, 35 comprise a hook shaped element 31 having a first portion 32 extending form its respective edge 15 in a substantially horizontal direction and a second portion 33 extending downwardly from the first portion 32 in a substantial vertical direction. Said hook shaped element 31 further comprises a protruding portion 34 placed on the second portion 33 that is shaped to define at least an upward faced surface 29 which in use is adapted to cooperate with a downward faced surface 30 provided on the adjacent floor element 1 thereby forming said third locking surfaces 27. In the present example, the downward faced surface 30 is provided in the form of a chamfered lower edge 35 of the support layer 14 so that it defines an abutment surface for the protruding portion 34 of the hook shaped element 31.

FIG. 18 shows an embodiment wherein, the portions of the edges 15 adapted to cooperate with the hook shaped element 31, i.e. the portions of the edges 15 provided with the chamfered edges 35 can be provided with a beveled upper edge 36 opposite to the chamfered edge 35 adapted to help the bending of the second portion 33 of the hook shaped element 31 during the translational downward movement F for the coupling of the floor elements 11.

In the present embodiment, as clear from FIGS. 6, 7 and the cross sections of FIG. 6 shown in FIGS. 8-11, the hook shaped element 31 is provided on a first edge 15, for example a first short edge 15, on the sections 37 next to a female part 17, and on a second edge 15, for example a first long edge 15, on the male parts 13, preferably on a side of the male part 13 which is substantially parallel to the related edge 15. Obviously, the chamfered lower edges 35 defining the downward faced surface 30 is provided on the corresponding portions of the opposite edges 15, i.e. the sections 37 of the opposite short edge 15 next to the male part 16, and on the female parts 17 of the opposite long edge 15, preferably on the bottom 38 or innermost part of the recess 18 formed by the female parts 17.

In this embodiment, the hook shaped element 31 disposed on the sections 37 free from the male part 16 or the female part 17, in this example the hook shaped element 31 on the short edge 15, is placed beneath the decorative layer 3 so that a C-shaped recess 39 is formed between the protruding portion 34 of the hook shaped element 31 and the decorative layer 3.

In the embodiment shown in FIGS. 15 and 12, the third locking surfaces 27 are also formed by a top surface 40 of said male part 16 and the downward faced surface 30 defined by the undercut 19 formed by said female part 17.

As visible from FIG. 15, a first set 28 of third locking surfaces 27 is formed by the upward faced surface 29 provided on the protruding portion 34 of the hook shaped element 31 which cooperates with the downward faced surface 30 defined by the chamfered edge 35 provided on the adjacent floor element 1, while a second set 28 of third locking surfaces 27 is formed by the upward faced surface 29 defined by the upper surface 41 of the support layer 14 and the downward faced surface 30 defined by the bottom surface 12 of the decorative layer 3. In this case, the section 37 of a first floor element 1, provided with the chamfered edge 35, is at least partially inserted in the C-shaped recess 39 formed between the protruding portion 34 and the upper decorative layer 3.

As visible from FIG. 15 the two sets 28 of third locking surfaces 27 are disposed in succession one after the other in a substantially vertical direction Z, or in other words, they are present in one and the same cross-section taken along the respective edge 15.

FIG. 16 shows a cross section of FIG. 14 wherein only one set 28 of third locking surfaces 27 is formed limiting the movement in only one vertical direction Z. Said set 28 of third locking surfaces 27 is at least formed by the top surface 40 of the male part 16 and the downward faced surface 30 defined by the undercut 19 formed by the female part 17 of the adjacent floor element 1, i.e. the bottom surface 12 of the decorative layer 3 delimiting said undercut 19 in an upward direction Z.

FIGS. 19-23 show different examples of the male parts 16 and the female parts 17. FIG. 19 shows an alternative embodiment wherein the male part 16 and the female part 17 are T-shaped, in a top planar view, with the head 42 of the T forming the male part 16 engaging behind portions 43 of the female part 17 so that the second locking surfaces 22 are at least formed by surfaces 44 delimiting the male part 16 and female part 17 in a direction Y perpendicular the coupled edges 15. In the embodiment shown in FIG. 19 the first locking surfaces 21 and the second locking surfaces 22 are distinct. FIG. 20 shows an example wherein the male part 16 and the female part 17 have curved contours 45 in a top planar view, so that the two sets of first and second locking surfaces 21, 22 are formed by a continuously curved surface 45 in a top planar view. FIG. 21 shows an example wherein the male part 16 and the female part 17 comprise two opposite curved surfaces 46 so that each curved surface 46 forms one set 28 of first and second locking surfaces 14, 15. FIG. 22 shows an example wherein the male part 16 and the female part 17 have contours comprising a curved side 47 and an opposite straight side 48. FIGS. 23 and 24 show alternative examples wherein the male part 16 and the female part 17 have contours 20 formed by straight sides 49.

FIGS. 25 and 26-28 shows different embodiments wherein the first locking surfaces 21 and the second locking surfaces 22 are formed on first resilient arms 50 adapted to be bent when the floor elements 1 are coupled together thereby exerting a thrust reaction which forces the floor elements 1 towards each other so that the relative movement of the floor elements 1 in a horizontal direction X, Y is limited.

The first resilient arms 50 are disposed in a direction which is substantially horizontal and are adapted to bent in a direction R substantially horizontal. The first resilient arms 50 can delimit the male part 16 and/or the female part 17 in a direction along the coupled edges 15.

For example, FIGS. 25, 26 and 27 show embodiments wherein the female part 17 comprises two firsts resilient arms 50 limiting the recess 18 formed by the female part 17 itself in both the opposite directions X along the respective edge 15. FIG. 28 shows an alternative embodiment wherein the male part 16 comprises two opposites first resilient arms 50.

The vertical locking elements 31, 35 in particular the hook shaped elements 31 and the chamfered edge 35 can be provided also on the variants of male parts 16 and female parts 17 shown in FIGS. 19-24 and 25-28, for example the hook shaped element 31 can be provided on the head 42 of the T-shaped male part 16 of FIG. 18.

The third locking surfaces 27 comprise portions 29 provided on second resilient arms 51 disposed in a direction Z which is substantially vertical and are adapted to bent in a direction S substantially horizontal. In the preferred example described above the hook shaped element 31, and more in detail the second portion 33 of the hook shaped element 31, substantially define the second resilient arm 51.

FIGS. 29-31 shows an alternative embodiment of the invention wherein the male parts 16 and the female parts 17 are shaped in the form of a tongue 52 and a groove 53 that substantially run through the whole length of the related edge 15.

FIG. 31 shows that in a coupled condition of two adjacent floor elements 1 according to this alternative embodiment, only the second and the third locking surfaces 22, 27 are formed.

In this example, the second locking surfaces 22 are at least formed by surfaces 54 delimiting the tongue 21 and the groove 22 in a direction perpendicular the coupled edges 15. For example, the second locking surfaces 22 are formed by a downwardly projecting protrusion 55 of the tongue 52 and from a cooperating therewith recess 56 of the groove 53.

In this alternative embodiment, two sets 28 of third locking surfaces 27 limiting the movement in mutually opposite vertical direction Z are disposed in succession one after the other in a substantially vertical direction Z. For example, the two sets 28 of third locking surfaces 27 are formed respectively by a bottom surface 57 of the tongue 52 cooperating with an upward faced surface 58 of the groove 53, and by an upper surface 59 of the tongue 52 and a cooperating therewith downward faced surface 60 of the groove 53.

In this embodiment, the support layer 14 is preferably made of fiber cement, and has a thickness C of 6 mm.

The present invention is in no way limited to the hereinabove described embodiments, but such floor, floor covering and floor elements may be realized according to different variants without leaving the scope of the present invention.

Further, as is clear from the content of the description, the present invention relates to one or more of the items as listed below, numbered from 1 to 50:

1.—A floor element 1 for forming a floor covering 2, wherein this floor element comprises a decorative layer 3 made of a ceramic material and a support layer 14 arranged below this decorative layer 3, wherein the support layer 14 comprises edges 15 provided with coupling elements 16, 17, 31, 35 configured to realize a mechanical coupling with coupling elements 16, 17, 31, 35 of an adjacent floor element 1 and wherein the floor element 1 comprises a reinforcing layer 11 arranged in between the decorative layer 3 and the support layer 14.

2.—The floor element 1 in accordance with item 1, wherein the reinforcing layer 11 comprises fiberglass layer.

3.—The floor element 1 in accordance with item 2, wherein the reinforcing layer 11 comprises a fiberglass mat.

4.—The floor element 1 in accordance with item 1, wherein the reinforcing layer 11 comprises a metal plate.

5.—The floor element 1 in accordance with item 4, wherein the metal plate 11 has a coefficient of thermal expansion higher than the coefficient of thermal expansion of the decorative layer 3.

6.—The floor element 1 in accordance with any of the preceding items, wherein it comprises an intermediate layer 13 disposed in between the reinforcing layer 11 and the support layer 14.

7.—The floor element 1 in accordance with item 6, wherein the intermediate layer 13 is made of the same material of the decorative layer 3.

8.—The floor element 1 in accordance with item 6 or 7, wherein the intermediate layer 13 has the same thickness A of the decorative layer 2.

9.—The floor element 1 in accordance with any of the preceding items, wherein the decorative layer has a thickness A comprised between 4 and 15 mm.

10.—The floor element 1 in accordance with any of the preceding items, wherein it has a thickness of 13 mm or less.

11.—The floor element 1 in accordance with any of the preceding items, wherein instead of a ceramic material the decorative layer 3 is made of a brittle material.

12.—The floor element 1 in accordance with any of the preceding items, wherein instead of a ceramic material the decorative layer 3 is made of natural stone, glass or concrete.

13.—The floor element 1 in accordance with any of the preceding items, wherein the support layer 14 is made of a polymeric material.

14.—The floor element 1 in accordance with item 13, wherein the polymeric material is PVC.

15.—The floor element 1 in accordance with any of the preceding items, wherein the support layer 14 is made of fiber cement.

16.—The floor element 1 in accordance with any of the preceding items, wherein the coupling elements 16, 17, 31, 35 are configured to realize a coupling by means of a translational downward motion F of the floor element 1 with respect to the adjacent floor element 1.

17.—The floor element 1 in accordance with any of the preceding items wherein the coupling elements 16, 17, 31, 35 comprise at least one male part 16 and at least one female part 17.

18.—The floor element 1 in accordance with item 17, wherein the male part 16 is in the form of a tongue 52 and in that the female part 17 is in the form of a groove 53.

19.—The floor element 1 in accordance with item 17, wherein the male and female part 16,17 in a top plane view are dovetail shaped.

20.—The floor element 1 in accordance with any of the preceding items, wherein in a coupled condition of two of said adjacent floor elements 1 locking surfaces 21, 22, 27 are formed limiting the mutual movement of said floor elements in a vertical Z and/or horizontal X, Y direction.

21.—The floor element 1 in accordance with item 20, wherein in a coupled condition of two of said adjacent floor elements 1 first locking surfaces 21 are formed limiting the mutual movement of said floor elements 1 in a horizontal direction X along the coupled edges 15, as well as second locking surfaces 22 limiting the mutual movement of said floor elements 1 in a direction Y that is substantially horizontal and perpendicular to the coupled edges 15, and third locking surfaces 27 limiting the mutual movement of said floor elements 1 in a direction that is substantially vertical Z.

22.—The floor element 1 in accordance with any of the item 20 or 21, wherein said locking surfaces 21, 22, 27 comprise portions positioned on resilient arms 50, 51.

23.—The floor element 1 in accordance with any of the preceding items, wherein the decorative layer 3 is mounted on the support layer 14 in such a way that, in a coupled condition of two of said floor elements 1 an intermediate distance 8 is available between the decorative layers 3.

24.—Floor element 1 for forming a floor covering 2 wherein the floor elements 1 comprise edges provided with coupling elements 16, 17, 31, 35 adapted to cooperate with coupling elements 16, 17, 31, 3 of an adjacent similar floor element 1 in said floor covering 2, wherein the coupling elements 16, 17, 31, 3 comprise at least one male part 16 and at least one female part 17, wherein in a coupled condition of two of said adjacent floor elements 1 first locking surfaces 21 are formed limiting the mutual movement of said floor elements 1 in a horizontal direction X along the coupled edges 15, as well as second locking surfaces 22 limiting the mutual movement of said floor elements 1 in a direction Y that is substantially horizontal and perpendicular to the coupled edge 15, and third locking surfaces 27 limiting the mutual movement of said floor elements 1 in a direction that is substantially vertical Z, wherein in said coupled condition two sets 28 of third locking surfaces 27 are formed, wherein said sets limit the movement in mutually opposite vertical directions.

25.—Floor element 1 of item 24, wherein said two sets 28 of third locking surfaces 27 are disposed in succession one after the other in a substantially vertical direction Z.

26.—Floor element 1 in accordance with any of the items 24 or 25, wherein said two sets 28 of third locking surfaces 27 comprise portions provided on sections 37 of the edges 15 free from the male part 16 and the female part 17.

27.—Floor element 1 of item 24, wherein said two sets 28 of third locking surfaces 27 are sequentially, and preferably alternatingly, disposed one after the other in a direction X along the coupled edges 15.

28.—Floor element 1 in accordance with item 27, wherein a first set 28 of the third locking surfaces 27 comprises portions positioned on the male and the female part 16, 17 and a second set 28 of said third locking surfaces comprises portions positioned on sections 37 of the coupled edges 15 free from the male and the female part 16, 17.

29.—Floor element 1 in accordance with any of the items from 24 to 28, wherein said first and second locking surfaces 21, 22 are coinciding.

30.—Floor element 1 in accordance with any of the items from 24 to 29, wherein said first locking surfaces 21 and/or said second locking surfaces 22 are at least formed by surfaces 24 delimiting said male and female part 16, 17 in a direction X along the coupled edges 15.

31.—Floor element 1 in accordance with any of the items from 24 to 30, wherein two sets 23 of first locking surfaces 21 and/or second locking surfaces 22 are available on said male and female part 16, 17, wherein said sets 23 limit the movement in the direction X along the coupled edges 15 in mutually opposite directions.

32.—Floor element 1 in accordance with any of the items from 24 to 31, wherein said male and female part 16, 17 can be engaged together by means of a translational downward motion F of one of said adjacent floor elements 1 towards the other.

33.—Floor element 1 in accordance with any of the items from 24 to 32, wherein said first, second and/or third locking surfaces 21, 22, 27 comprise portions positioned on resilient arms 50, 51.

34.—Floor element 1 in accordance with any of the items from 24 to 33, wherein said male part 16 can be engaged into said female part 17 by means of a substantially horizontal motion of one of said adjacent floor elements 1 towards the other.

35.—Floor element 1 in accordance with any of the items from 24 to 34, wherein said coupling elements 16, 17, 31, 35 are configured in such a way that the floor elements 1 can be uncoupled by means of a translational upward motion G.

36.—Floor element 1 in accordance with any of the items from 24 to 35, wherein it comprises a decorative layer 3 mounted on a support layer 14.

37.—Floor element 1 in accordance with item 36, wherein said female part 17 extends inwardly beyond the decorative layer 3 to thereby form an undercut 19 of the lower surface 12 of said decorative layer 3.

38.—Floor element 1 in accordance with item 37, wherein said third locking surfaces 27 are at least formed by a top surface 40 of said male part 16 and an upper surface of the undercut 19 formed by said female part 17.

39.—Floor element 1 in accordance with any of the items from 36 to 39, wherein said male part 16 is substantially or wholly formed in said support layer 14.

40.—Floor element 1 in accordance with any of the items from 24 to 39, wherein in a coupled condition of two of said floor elements 1 an intermediate distance 8 is available between respective upper edges 9.

41.—The floor element 1 in accordance with any of the items from 24 to 40, wherein the male and the female part 16,17 are disposed in correspondence of a limited length L portion of the related edge 15, wherein such limited length L is smaller than the whole length of the related edge 15.

42.—The floor element 1 in accordance with item 41, wherein it comprises a plurality of male and/or female part 16, 17 on a single edge 15.

43.—The floor element 1 in accordance with item 42, wherein the male and/or female part 16, 17 of said plurality are symmetrically disposed with respect to the midpoint M of the respective edge 15.

44.—A floor covering 2 comprising a plurality of adjacent floor elements 1, wherein at least a floor element 1 comprise a decorative layer 3 of ceramic material and a support layer 14 disposed below the decorative layer 3, wherein the floor covering 2 comprises the combination of the following features:

at least one floor element 1 comprises a reinforcing layer 11 in between the decorative layer 3 and the support layer 14;

the floor elements 1 comprise coupling means 16, 17, 31, 35 configured to realize a coupling with coupling elements 16, 17, 31, 35 of adjacent floor elements 1;

the floor covering 2 comprises a grout 10 filling an intermediate distance 8 separating the decorative layers 3 of the floor elements 1.

45.—The floor covering 2 in accordance with item 44, wherein it comprises an underlayment beneath the floor elements 1 configured to act as a moisture and/or noise barrier.

46.—The floor covering 2 in accordance with any of the items 44 or 45, wherein the floor elements 1 lie on a subsurface and in that the floor elements 1 are separated from said subsurface.

47.—The floor covering 2 in accordance with any of the items from 44 to 46, wherein the floor elements 1 have an elongated shape.

48.—The floor covering 2 in accordance with any of the items from 44 to 47, wherein the floor elements 1 are disposed in an offset relationship.

49.—The floor covering 2 in accordance with any of the items from 44 to 48, wherein the floor elements 1 2 are disposed in a herringbone pattern.

50.—The floor covering 2 in accordance with any of the items from 44 to 49, wherein instead of a ceramic material the decorative layers 3 of the floor elements 1 are made of natural stone, glass or concrete.

What is claimed is:

1. A floor element for forming a floor covering, the floor element comprising:

a decorative layer made of a ceramic material;

a support layer arranged below the decorative layer, the support layer comprising a rigid polyvinylchloride (PVC), wherein the rigid PVC comprises less than 15 phr of plasticizer; and a reinforcing layer located between the decorative layer and the support layer, wherein the support layer comprises edges provided with coupling elements configured to realize a mechanical coupling with coupling elements of an adjacent floor element, wherein the coupling elements comprise at least one male part and at least one female part, wherein in a coupled condition of adjacent floor elements, locking surfaces are formed limiting the mutual movement of the adjacent floor elements in at least in a vertical direction, wherein the male part protrudes outwardly beyond an upper edge of the decorative layer and the female part extends inwardly beyond an upper edge of the decorative layer to thereby form an undercut underneath the decorative layer so that the locking surfaces limiting the movement in the vertical direction are at least formed by a top surface of the male part and an upper surface of the undercut formed by the female part, wherein the upper surface of the undercut is a bottom surface of the decorative layer delimiting the undercut in an upward direction, wherein the floor element has an impact strength greater than 1.91 Newton-meter (Nm), wherein in a coupled condition of the adjacent floor elements, the locking surfaces are formed, limiting the mutual movement of the adjacent floor elements in at least one horizontal direction, wherein in a coupled condition of the adjacent floor elements, first locking surfaces are formed limiting the mutual movement of the adjacent floor elements in a horizontal direction along the coupled edges, as well as second locking surfaces limiting the mutual movement of the adjacent floor elements in a direction that is substantially horizontal and perpendicular to the coupled edges, and wherein the locking surfaces comprise portions positioned on resilient arms.

2. The floor element according to claim 1, wherein the reinforcing layer comprises a fiberglass layer or a fiberglass mat.

3. The floor element according to claim 1, wherein the reinforcing layer comprises a metal plate with a coefficient of thermal expansion higher than the coefficient of thermal expansion of the decorative layer.

4. The floor element according to claim 1, wherein the decorative layer has a thickness between 4 and 15 mm.

5. The floor element according to claim 1, wherein the floor element has a thickness of 13 mm or less.

6. The floor element according to claim 1, wherein the decorative layer comprises a brittle material and/or comprises natural stone, glass, or concrete.

7. The floor element according to claim 1, wherein the support layer further comprises fiber cement.

8. The floor element according to claim 1, wherein the coupling elements are configured to realize the coupling by means of a translational downward motion of the floor element with respect to the adjacent floor element.

9. The floor element according to claim 1, wherein the male part is in the form of a tongue and the female part is in the form of a groove, or wherein the male part and the female part are dovetail shaped in a top plane view.

10. The floor element according to claim 1, wherein the decorative layer is mounted on the support layer in such a way that, in a coupled condition of two of the floor elements an intermediate distance is available between the decorative layers.

11. A floor covering comprising a plurality of adjacent floor elements according to claim 1.

12. A floor covering comprising a plurality of adjacent floor elements, wherein at least one floor element of the plurality of floor elements comprises:

a decorative layer of ceramic;

a support layer arranged below the decorative layer, the support layer comprising a rigid polyvinylchloride (PVC), wherein the rigid PVC comprises less than 15 phr of plasticizer, wherein the at least one floor element of the plurality of floor elements has an impact strength greater than 1.91 Newton-meter (Nm), wherein the floor covering comprises the combination of the following features:

coupling elements configured to realize a coupling with coupling elements of adjacent floor elements; and a grout filling an intermediate distance separating the decorative layers of the floor elements, wherein the coupling elements comprise at least one male part and at least one female part, wherein in a coupled condition of adjacent floor elements, locking surfaces are formed limiting the mutual movement of the adjacent floor elements in at least in a vertical direction, wherein the male part protrudes outwardly beyond an upper edge of the decorative layer and the female part extends inwardly beyond an upper edge of the decorative layer to thereby form an undercut underneath the decorative layer so that the locking surfaces limiting the movement in the vertical direction are at least formed by a top surface of the male part and an upper surface of the undercut formed by the female part, wherein the upper surface of the undercut is a bottom surface of the decorative layer delimiting the undercut in an upward direction, wherein the floor element has an impact strength greater than 1.91 Newton-meter (Nm), wherein in a coupled condition of the adjacent floor elements, the locking surfaces are formed, limiting the mutual movement of the adjacent floor elements in at
least one horizontal direction,
wherein in a coupled condition of the adjacent floor
elements, first locking surfaces are formed limiting the
mutual movement of the adjacent floor elements in a
horizontal direction along the coupled edges, as well as
second locking surfaces limiting the mutual movement
of the adjacent floor elements in a direction that is
substantially horizontal and perpendicular to the
coupled edges, and
wherein the locking surfaces comprise portions posi-
tioned on resilient arms.

13. The floor covering according to claim 12, wherein the
floor covering comprises an underlayment beneath the plu-
rality of floor elements configured to act as a moisture and/or
noise barrier.

14. The floor covering according to claim 12, wherein the
plurality of floor elements lie on a subsurface and wherein
the plurality of floor elements are separated from the sub-
surface.

15. The floor covering according to claim 12, wherein the
plurality of floor elements have an elongated shape.

16. The floor covering according to claim 12, wherein the
plurality of floor elements are disposed in an offset relation-
ship.

* * * * *